United States Patent [19]
Chen

[11] Patent Number: 5,929,924
[45] Date of Patent: Jul. 27, 1999

[54] PORTABLE PC SIMULTANEOUSLY DISPLAYING ON A FLAT-PANEL DISPLAY AND ON AN EXTERNAL NTSC/PAL TV USING LINE BUFFER WITH VARIABLE HORIZONTAL-LINE RATE DURING VERTICAL BLANKING PERIOD

[75] Inventor: Andy His-Wen Chen, San Jose, Calif.

[73] Assignee: NeoMagic Corp., Santa Clara, Calif.

[21] Appl. No.: 08/815,401

[22] Filed: Mar. 10, 1997

[51] Int. Cl.$^6$ .................................................. H04N 7/00
[52] U.S. Cl. ........................ 348/552; 348/524; 348/543; 348/458
[58] Field of Search .................................... 348/552, 521, 348/524, 543, 550, 458, 459, 448; H04N 7/00

[56] References Cited

U.S. PATENT DOCUMENTS

| | | | |
|---|---|---|---|
| 5,325,179 | 6/1994 | Azar et al. ................................ | 348/443 |
| 5,327,243 | 7/1994 | Maietta et al. ........................... | 348/565 |
| 5,381,182 | 1/1995 | Miller et al. ............................. | 348/448 |
| 5,404,169 | 4/1995 | Bae ......................................... | 348/443 |
| 5,426,731 | 6/1995 | Masukane et al. ..................... | 395/162 |
| 5,455,626 | 10/1995 | Xu et al. ................................. | 348/385 |
| 5,473,382 | 12/1995 | Nohmi et al. ........................... | 348/448 |
| 5,510,843 | 4/1996 | Keene et al. ............................ | 348/446 |
| 5,526,055 | 6/1996 | Zhang et al. ............................ | 348/510 |

OTHER PUBLICATIONS

Jim Seymour's Co., PC Magazine, Oct. 22, 1996, pp. 94,317, Communications Specialties, Inc. various Web Pages/FAQ Oct. 8, 1996.

Tview Gold Web Pages, Oct. 8, 1996.

HyperConverter Product Literature, Aug. 1993.

Compaq Armada 4100 Web Pages, Jun. 1996.

Compaq ON–Line Support Forum, Wayne Hancy, Dec. 9, 1996, Nov. 22, 1996, Sep. 11, 1996.

*Primary Examiner*—Sherrie Hsia
*Attorney, Agent, or Firm*—Stuart T. Auvinen

[57] ABSTRACT

A scan converter receives VGA or SVGA graphics data and outputs NTSC or PAL TV data. The scan converter is integrated inside a personal computer's graphics controller, allowing the digital-to-analog converter (DAC) to be used for either CRT-pixel conversion or TV encoding. The VGA timing is altered to better match with TV scan-conversion. The horizontal rate is not constant but can be increased or decreased during the vertical blanking period. A second register is provided for the total number of pixels in a line during vertical blanking, while a first register contains the total number of pixels in a displayable line not during the vertical blanking period. Since lines with fewer pixels require less time to display, the period of time or rate for blanked lines is changed. An extra horizontal line is added during vertical blanking for every second frame for SVGA conversion to better match the asymmetry of TV standards. While CRT's cannot accept the variable line rate, flat-panel displays can operate properly even when the horizontal rate varies. Thus an image can simultaneously be displayed on both an external TV and on a portable computer's flat-panel display.

20 Claims, 13 Drawing Sheets

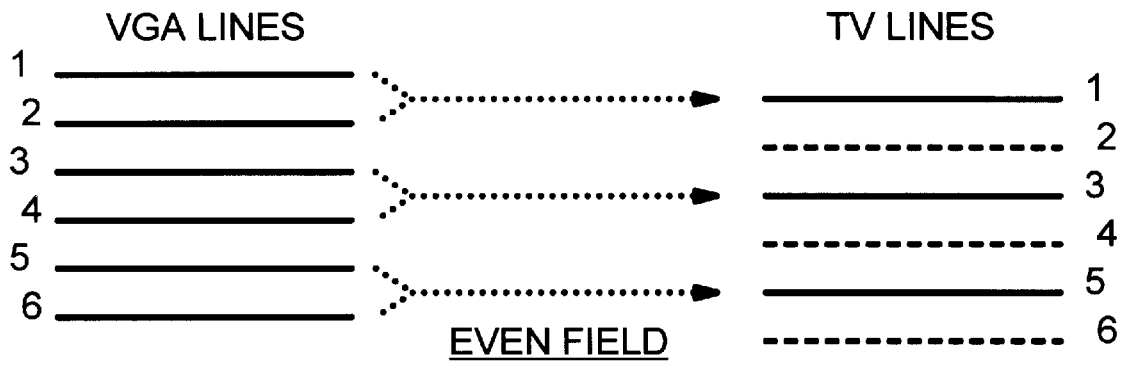
FIG. 2A  EVEN FIELD  2:1 LINE RATIO
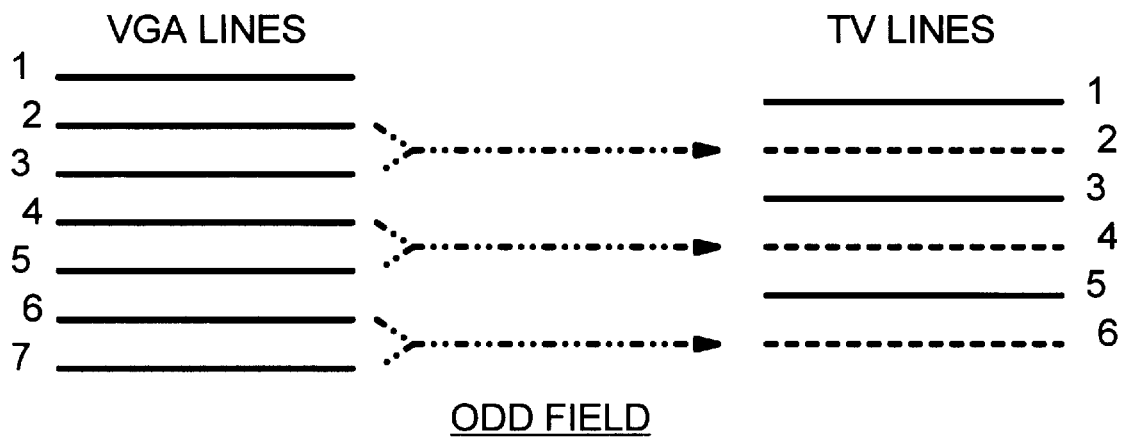
FIG. 2B  ODD FIELD  VGA TO PAL-TV

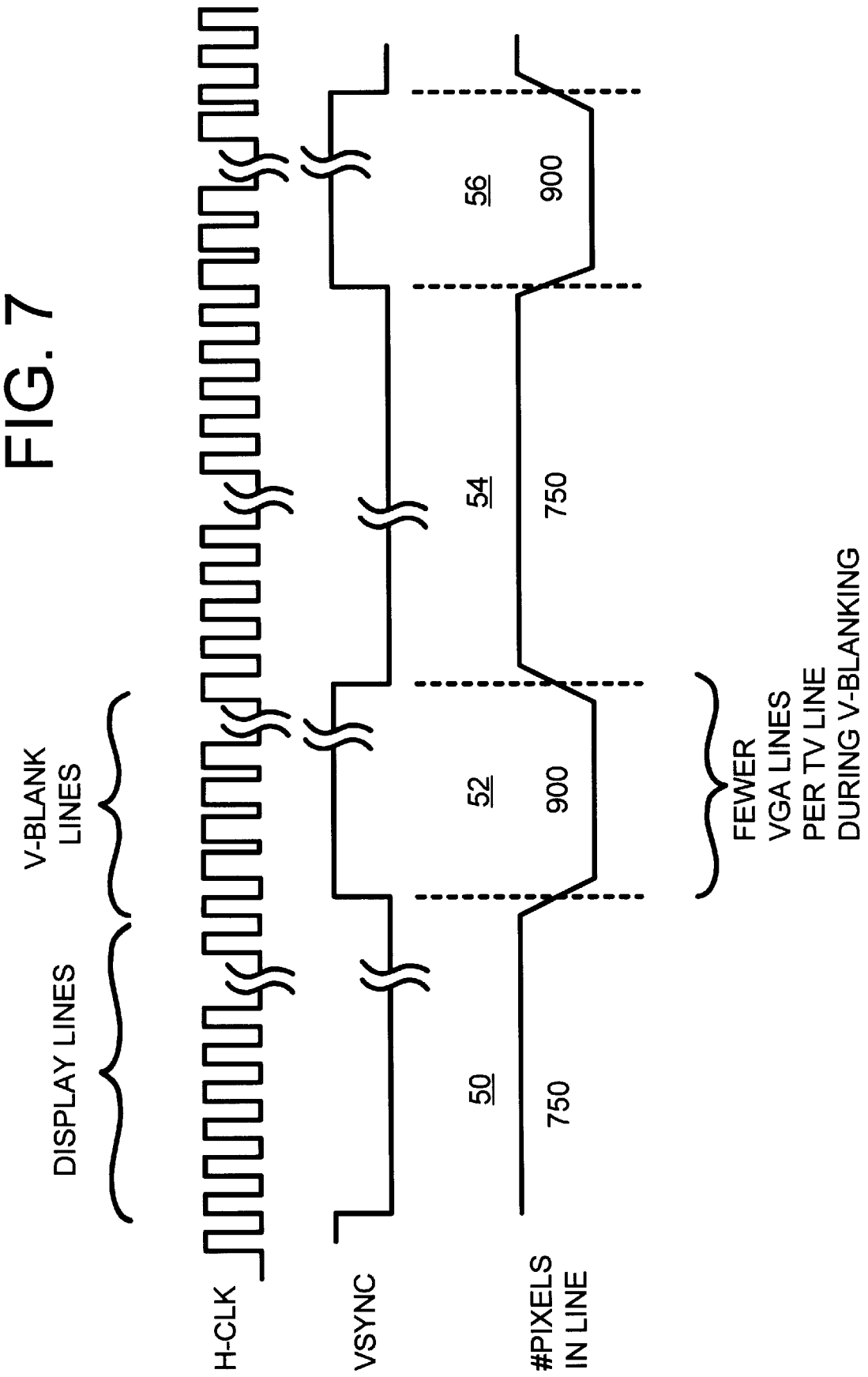

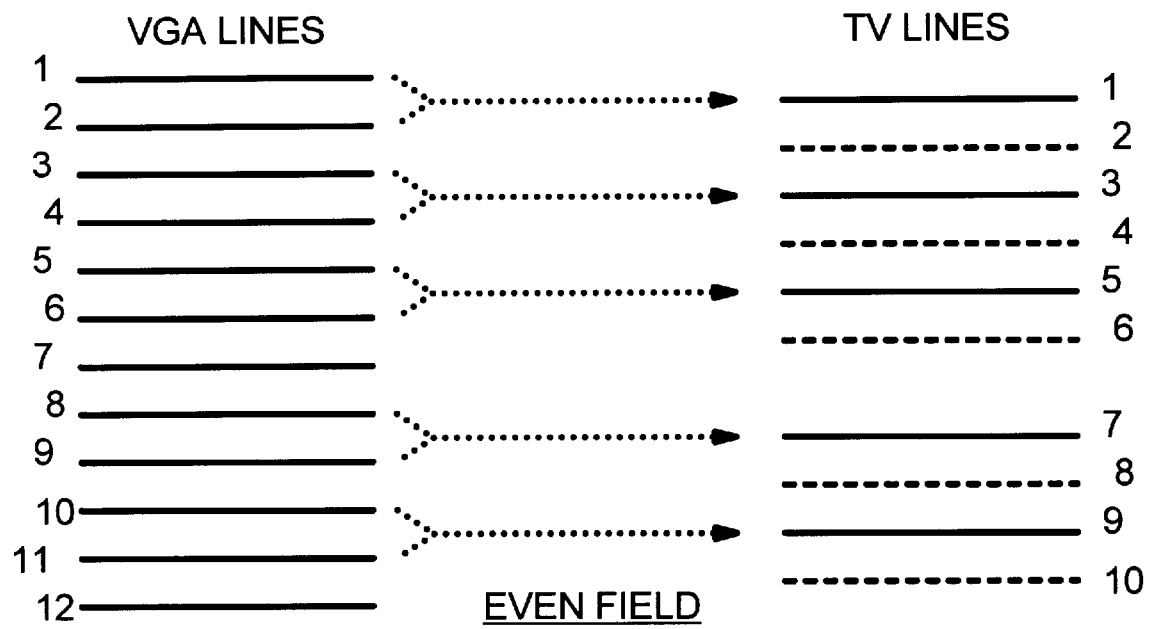
FIG. 8A  EVEN FIELD  12:5 LINE RATIO
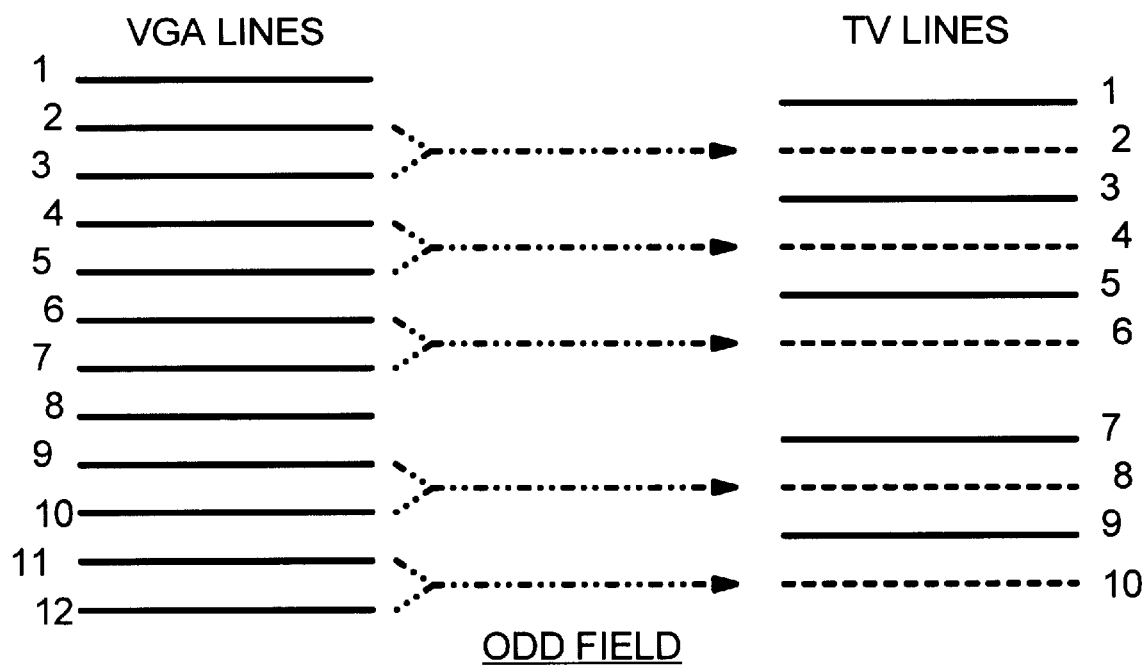
FIG. 8B  ODD FIELD  VGA TO NTSC-TV

3:1 LINE RATIO

SVGA TO NTSC-TV

5:2 LINE RATIO

SVGA TO PAL-TV

PORTABLE PC SIMULTANEOUSLY DISPLAYING ON A FLAT-PANEL DISPLAY AND ON AN EXTERNAL NTSC/PAL TV USING LINE BUFFER WITH VARIABLE HORIZONTAL-LINE RATE DURING VERTICAL BLANKING PERIOD

BACKGROUND OF THE INVENTION

1. Field of the Invention

This invention relates to graphics systems, and more particularly for a SVGA-to-TV scan converter integrated with a portable computer's graphics sub-system.

2. Description of the Related Art

Graphics standards for personal computers (PC's) have developed independently of standards for televisions. Thus a television monitor cannot receive computer-graphics data without a converter device to translate PC-graphics data into television picture data.

Converter devices known as scan converters are available for purchase by PC users. Scan converters are typically external devices which plug into the PC's graphics output port. The PC's graphics is converted to television format, either the National Television System Committee's NTSC standard or the Phase Alternation Line (PAL) standard common in foreign countries. The scan converters are often rather crude devices which lose a significant amount of the graphics data displayed on the PC's screen. Flicker can also be a problem.

FIG. 1 is a diagram illustrating the over-scan problem when translating PC graphics to TV. PC graphics display 11 displays many horizontal lines of pixels; five of these lines are shown in the simple example of FIG. 1. All displayable lines of computer-generated graphics occur in displayable area 14, which for PC's is typically set slightly smaller than physical screen area 12 so that all displayable lines are visible. Users can increase the horizontal and vertical span so that displayable area 14 touches the edge of physical screen area 12, but usually a small dark region 16 is present between displayable area 14 and the edge of physical screen area 12. Computer programs often place important graphics data near the edge of displayable area 14, so many PC users prefer to adjust displayable area 14 so that it entirely falls within physical screen area 12. Otherwise, the PC is difficult to operate, such as when the cursor is moved to the extreme edge of displayable area 14. The cursor would not be visible in such a case if displayable area 14 were larger than physical screen area 12, leaving the user to wonder where the cursor went to.

Televisions were originally designed to display video information from a broadcaster. Aesthetics were more important than viewing the entire broadcast image, so a dark region 16 such as on PC monitor 11 is unacceptable for television. To ensure that no dark region appears, a television image contains several over-scanned horizontal lines which fall outside physical screen area 24 and are not visible to the viewer. In FIG. 1, lines 1 and 5 are not visible since they fall outside of physical screen area 24. Lines 2, 3, and 4 are visible. Lines 1 and 5 are in over-scan area 18, falling outside physical screen area 24 but within broadcast image 22.

Television over-scan is a problem when converting PC graphics data to television format. Simply converting the pixels in the PC's displayable area 14 to the television broadcast image 22 causes lines in over-scan area 18 to not be visible. While just two lines are shown in FIG. 1 as falling in over-scan area 18, actual televisions have a large over-scan area 18 of dozens of horizontal lines. When the PC user moves the mouse cursor into over-scan area 18, perhaps by mistake, the cursor is not visible, leaving the user to guess where the mouse cursor went to.

The television standards require that the horizontal lines of graphics data be interleaved. Thus lines 1, 3, 5 . . . are sent to the television monitor as a first or even field, then lines 2, 4 . . . are sent as a second or odd field. Personal computer displays usually are non-interleaved, requiring that the lines be sent in order. Thus lines 1, 2, 3, 4, 5 . . . are sent to PC monitor 11 until all lines have been written. Scan conversion requires that the non-interleaved graphics from the PC be converted to interleaved data for the television.

PC displays are typically higher-performance displays than televisions, operating at roughly double the display rate of a television. Thus each frame displayed by the PC can be filtered to provide either the even or the odd field of the interleaved television. FIGS. 2A, 2B show that VGA lines from a PC can be selected, averaged, or filtered to produce half as many lines for one field of a TV image for the PAL standard. FIG. 2A shows that for the even field, VGA lines 1 and 2 are averaged together, perhaps on a pixel-by-pixel basis, to generate TV line 1. Likewise, VGA lines 3 and 4 produce TV line 3, and VGA lines 5 and 6 produce TV line 5. TV lines 2, 4, 6 are skipped during the even field.

FIG. 2B shows that for the odd field, VGA lines 2 and 3 are averaged together on a pixel-by-pixel basis to generate TV line 2. Likewise, VGA lines 4 and 5 produce TV line 4, and VGA lines 5 and 7 produce TV line 6. TV lines 1, 3, 5 are skipped during the odd field.

A simple ratio of two VGA lines for every TV line is needed for converting VGA to PAL-TV. The overall refresh rate of the TV is half of the VGA refresh rate, with one TV field being refreshed for each VGA screen refresh. Twice as many lines are being written to the VGA display as to the TV during any time period. The VGA timing may have to be adjusted slightly to match the PAL-TV timing standard for horizontal and vertical refresh rates. The pixel rates also differ; typically the number of pixels in each line are reduced as each line is converted.

SIMPLE 2:1 CONVERSION FOR VGA TO PAL-TV—FIG. 3

FIG. 3 is a diagram of the display and blanking periods for two VGA frames being converted to one PAL-TV frame. The VGA timing is set to have 625 lines, perhaps more than is otherwise required for a CRT or a flat-panel display, since only 480 lines of computer-generated graphics are displayed by the VGA standard. The PAL standard specifies exactly 625 lines for a frame; 313 lines in the even field, and 312 lines in the odd field. The extra line in the even field can be accounted for by adjusting the pipelining of the line conversion.

During even display period 40, 240 TV lines are written to the TV. These 240 lines are within the viewable area of the TV monitor. These 240 lines are generated from exactly twice as many VGA lines: 480, which are written to a PC monitor about one line-period before the corresponding line is written to the TV. During even vertical blanking period 42, the PC's CRT monitor and the TV monitor's picture tube are re-traced to the beginning of the first line from the end of the last line. This is a slow process, especially for TV, and 73 TV lines are required by the PAL specification. Although double 73 is 146, only 145 dummy VGA lines occur during this period, causing the pipelining of line to shift for the odd field relative to the even field.

During odd display period 44, 240 TV lines are written to the TV. These 240 lines are generated from exactly twice as many VGA lines: 480, which are written to a PC monitor about two line-periods before the corresponding line is written to the TV. During odd vertical blanking period 46, the PC's CRT monitor and the TV monitor's picture tube are re-traced to the beginning of the first line from the end of the last line so that the next even field can begin. The PAL specification requires 72 TV lines during odd blanking. Although double 72 is 144, 145 dummy VGA lines occur during this period, causing the pipelining of line to shift back for the next even field.

A constant ratio of two VGA lines for every TV lines can be used for conversion. However, standard VGA controllers display only 480 lines, and need relatively few lines during the vertical blanking period. Thus only 525 lines are normally used, rather than the 625 lines required for exact 2-to-1 conversion to PAL-TV. The PC user must use software to change the total number of lines from 525 to 625 for this conversion to operate properly. A 28.322 MHz pixel clock is assumed, with each line having a total of 906 pixels, including 640 displayable pixels.

2:1 CONVERSION TO NTSC-TV LOSES GRAPHICS DATA—FIG. 4

When a 2-to-1 line ratio is applied to the NTSC TV standard, some of the VGA lines displayed on the PC's monitor are not displayed on the TV. FIG. 4 highlights conversion from VGA to NTSC-TV with a loss of VGA data.

During even display period 41 only 200 TV lines are written to the TV for the NTSC standard rather than the 240 lines for the PAL standard. These 200 lines correspond to only 400 of the 480 viewable VGA lines. Thus 80 viewable VGA lines are lost when using 2-to-1 conversion for NTSC-TV.

During even vertical blanking period 43, vertical re-trace occurs. The NTSC specification requires 63 lines, corresponding to 125 VGA lines. Odd vertical blanking period 47 requires 62 lines.

During odd display period 45, 200 TV lines are written to the TV, and 400 VGA lines are written to the PC's display. The PC's vertical blanking period does not being for another 80 lines, when all 480 lines are written. Since these 80 VGA lines are converted to non-displayable TV lines in odd vertical blanking period 47, the graphics from these 80 lines are not displayed on the TV. Loss of graphics data is undesirable.

Other PC-graphics standards use a different number of lines, and conversion is more complex since the numbers do not match the TV standards as nicely as VGA does. Super-VGA (SVGA) is commonly used today, and some scan converters are available for SVGA. Unfortunately SVGA scan converters are expensive. While VGA scan converters can perform conversion using small memories containing one or two horizontal lines; SVGA converters use large memories which buffer an entire frame. Since a SVGA frame is 600 lines, the full-frame buffer is much more expensive than the line buffer.

What is desired is a scan converter which can convert PC graphics to TV formats. It is desired to convert SVGA graphics as well as VGA graphics, but without the expense of a full-frame buffer. It is desirable to use a line buffer rather than a frame buffer for scan conversion, even for SVGA. A method and apparatus for converting PC graphics to TV formats for arbitrary standards is desirable. It is desirable to use a line buffer for conversions with arbitrary ratios of PC lines to TV lines. It is also desired to exploit characteristics of portable PC's flat-panel displays for an integrated scan converter.

SUMMARY OF THE INVENTION

A graphics controller with an integrated scan converter displays a computer-generated graphics image on both a flat-panel display and an external television (TV). The graphics controller has a timing generator that generates timing signals including a horizontal timing signal and a vertical timing signal. The timing generator has a first rate means that generates the horizontal timing signal at a first rate when transferring horizontal lines of pixels displayed to a user. A second rate means generates the horizontal timing signal at a second rate when transferring blanked horizontal lines of pixels which are not displayed to a user. The first rate is not equal to the second rate.

A transfer means is for transferring horizontal lines of pixels to the flat-panel display at the first rate during a display period but transfers blanked lines of pixels to the flat-panel display at the second rate during a blanking period.

A TV encoder converts pixels from the transfer means to analog TV signals for display by the external TV. A TV connector is coupled to receive the analog TV signals from the TV encoder. It couples to the external TV.

A flat-panel-display interface receives the horizontal lines of pixels from the transfer means. It converts the horizontal lines of pixels for display by the flat-panel display. Horizontal lines of pixels transferred during the display period are visible to the user, but blanked horizontal lines of pixels transferred during the blanking period are not visible to the user.

Thus the horizontal lines of pixels are transferred to the flat-panel display at the first rate during the display period but are transferred at the second rate during the blanking period.

In further aspects of the invention the horizontal lines of pixels form an image visible on the flat-panel display and a substantially identical image simultaneously visible and on the external TV. Thus the image is simultaneously visible on the flat-panel display and on the external TV.

In still further aspects the flat-panel display is a non-interlaced display but the external TV is an interlaced display. The transfer means transfers all horizontal lines to the flat-panel display in sequence during each display period. However, the external TV receives only a first half of the horizontal lines during the display period. The external TV receives a second half of the horizontal lines during a next display period after the blanking period when the flat-panel display over-writes all the horizontal lines. Thus each pair of horizontal lines in the first half is separated by a horizontal line in the second half. A filter provides fewer horizontal lines to the external TV than to the flat-panel display for each display period. A line buffer is used to filter horizontal lines to the external TV. The line buffer contains a storage capacity insufficient to store all horizontal lines in the display period. Thus a full-frame buffer is not used for scan conversion.

In further aspects of the invention a first register stores a first total number of pixels in a horizontal line transferred during the display period. A second register stores a second total number of pixels in a blanked horizontal line transferred during the blanking period.

A pixel counter is incremented for each pixel in a horizontal line transferred to the flat-panel display. The pixel counter is reset by the horizontal timing signal after each horizontal line. The pixel counter outputs a current pixel count.

A multiplexer receives the first total number and the second total number. It outputs the first total number during the display period, but it outputs the second total number during the blanking period. The multiplexer outputs the first of the second total number as a total-pixels-in-current-line output. A comparator is coupled to the pixel counter and to the multiplexer. It outputs the horizontal timing signal when the total-pixels-in-current-line output from the multiplexer matches the current pixel count.

Thus the horizontal timing signal is generated at the first rate when transferring horizontal lines of pixels displayed to a user, but generated at the second rate when transferring blanked horizontal lines of pixels which are not displayed to a user. The first rate and the second rate are determined by the first and second total number of pixels in a horizontal line stored in the first and second registers.

The first total number of pixels in the horizontal line transferred during the display period includes displayable pixels and non-displayed pixels.

In further aspects the invention alternately adds an extra horizontal line to the blanking period for every second blanking period but not for all blanking periods. Every second blanking period is longer in duration than other blanking periods. Thus the extra horizontal line is added for half of the blanking periods.

BRIEF DESCRIPTION OF THE DRAWINGS

FIGS. 2A, 2B show that VGA lines from a PC can be selected, averaged, or filtered to produce half as many lines for one field of a TV image for the PAL standard.

FIG. 7 highlights that the horizontal line rate is decreased during vertical blanking by increasing the total number of pixels per line during vertical blanking.

FIGS. 8A, 8B show how VGA lines can be filtered in a 12:5 ratio to generate NTSC-TV lines.

DETAILED DESCRIPTION

The present invention relates to an improvement in scan converters for computers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

FLAT-PANEL DISPLAYS OPERATE WITH VARIABLE-FREQUENCY SIGNALS

The inventor has realized that the flat-panel display of a portable PC has less stringent timing requirements than a standard CRT monitor. In particular, a CRT monitor requires that horizontal and vertical timing signals have a constant frequency. Indeed, these signals are known as vertical and horizontal synchronization signals (vsync, hsync) and are used by the CRT to operate critical internal circuitry such as PLLs which must have a constant, regular frequency. The analog nature of the CRT makes constant-frequency signals mandatory.

Flat-panel displays are inherently digital rather than analog devices. Flat-panel displays do not use an electron beam, and thus perform no vertical or horizontal re-trace. A much shorter "recovery" period is typically specified by panel manufacturers. Constant-frequency signals do not need to be applied to many kinds of flat panels, and these panels can be paused during display refresh. Portable PC's often use a suspend or power-down mode which suspend and re-start panel refresh. Thus flat-panel displays by their nature are digital, variable-frequency devices.

VARIABLE-FREQUENCY SIGNALS ADAPT TO TV-CONVERSION REQUIREMENTS

The inventor has exploited these properties of flat-panel displays by changing the frequency of horizontal lines during a screen refresh. The frequency of the horizontal-line clock is adjusted during the vertical blanking period to better match the requirements for conversion to TV standards.

Adjusting or varying the frequency of the horizontal sync signal causes a CRT to lose sync, display annoying interference, and completely lose the picture and fail. A cardinal rule of desktop PC design is to have constant-frequency sync signals. Thus it would be quite surprising or even shocking to a PC designer to suggest that the "constant" synch signals be varied within each screen-refresh period. Yet the inventor has found that many, although not all, commercial flat-panels displays can accept variable-frequency sync signals. The inventor has exploited this discovery to adapt timing signals for TV scan conversion.

SIMULTANEOUS DISPLAY ON FLAT-PANEL AND TV—FIG. 5

Figure 1:
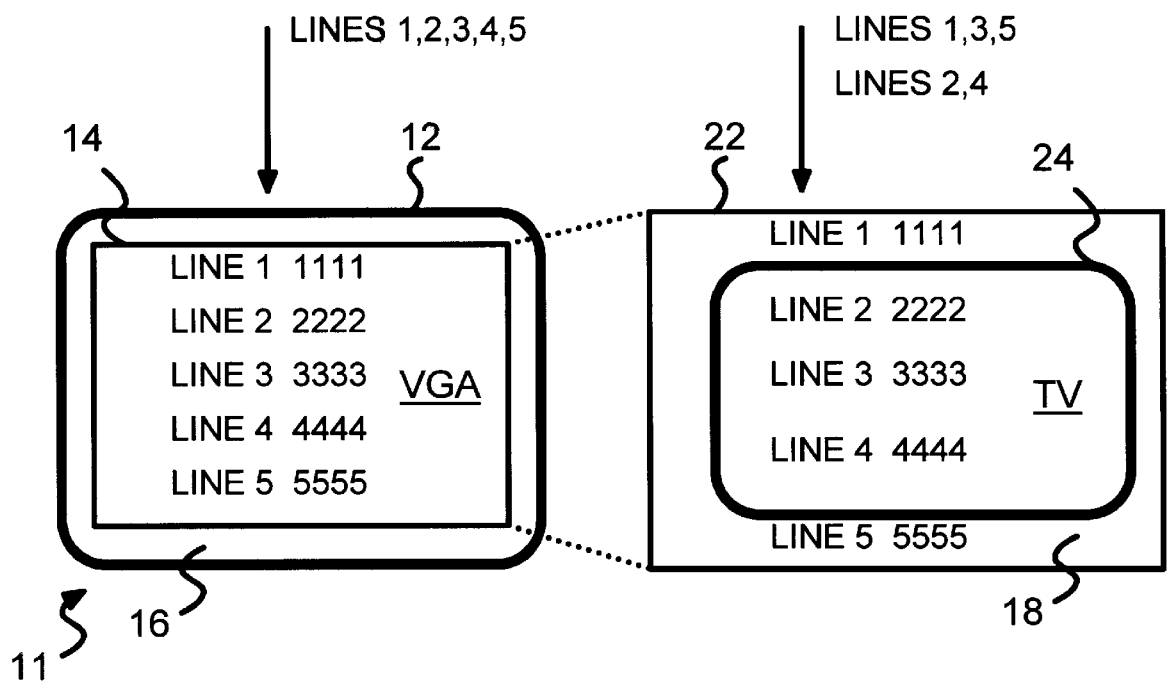
FIG. 1 is a diagram illustrating the over-scan problem when translating PC graphics to TV.
Figure 5:
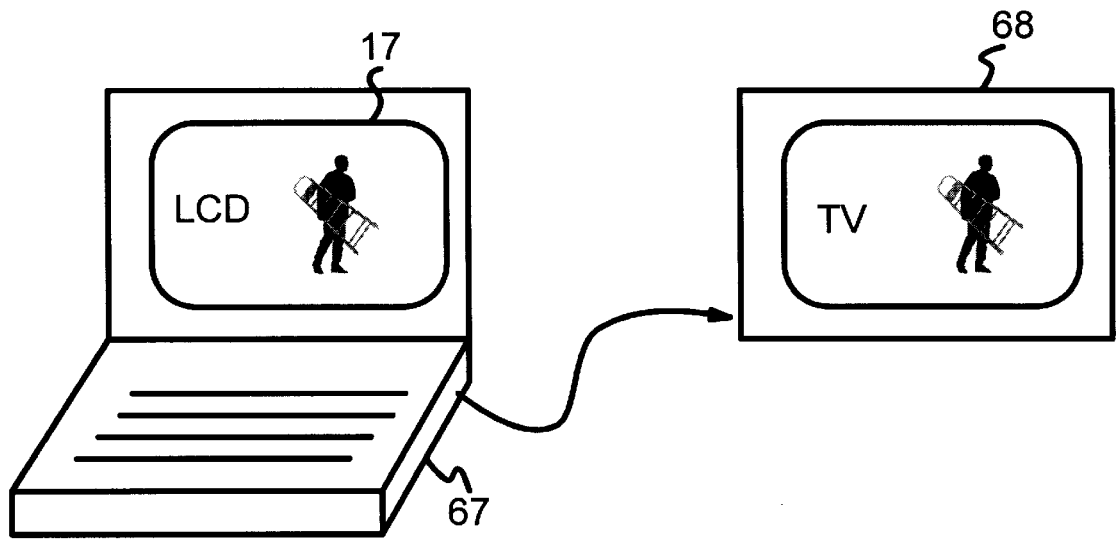
FIG. 5 shows a portable PC simultaneously displaying an image on a built-in flat-panel display and on an external TV monitor.

FIG. 5 shows a portable PC simultaneously displaying an image on a built-in flat-panel display and on an external TV monitor. External CRT's are often attached to portable PC's. An external scan converter can connect to the CRT port of the PC to convert CRT signals to TV format so that the PC's graphics can be seen on an external TV. A scan converter integrated into a portable PC is now being sold by Compaq Computer Corp. of Richardson Tex. as the Armada 4125 notebook PC. However, this scan converter does not allow the image to be viewed simultaneously on the external TV and on the flat-panel display. The flat-panel display must be disabled to enable the scan converter.

In contrast, portable PC 67 simultaneously displays the computer-generated graphics on both built-in flat-panel display 17 and external TV 68. This is useful when the user is making a presentation to a large group using a TV projector. The presenter uses the keyboard and mouse built into portable PC 67, which alter the image on flat-panel display 17 as well as external TV 68. If simultaneous display was not supported, the user would have to view the image on external TV 68 rather than on flat-panel display 17. Since presenters often have their back to external TV 68 to look at the audience, the user would awkwardly have to twist around and turn his back to the audience if simultaneous display was not available. Thus simultaneous display is highly desirable.

VGA SCAN CONVERSION TO NTSC BY VARYING HORIZONTAL RATE

Figure 3:
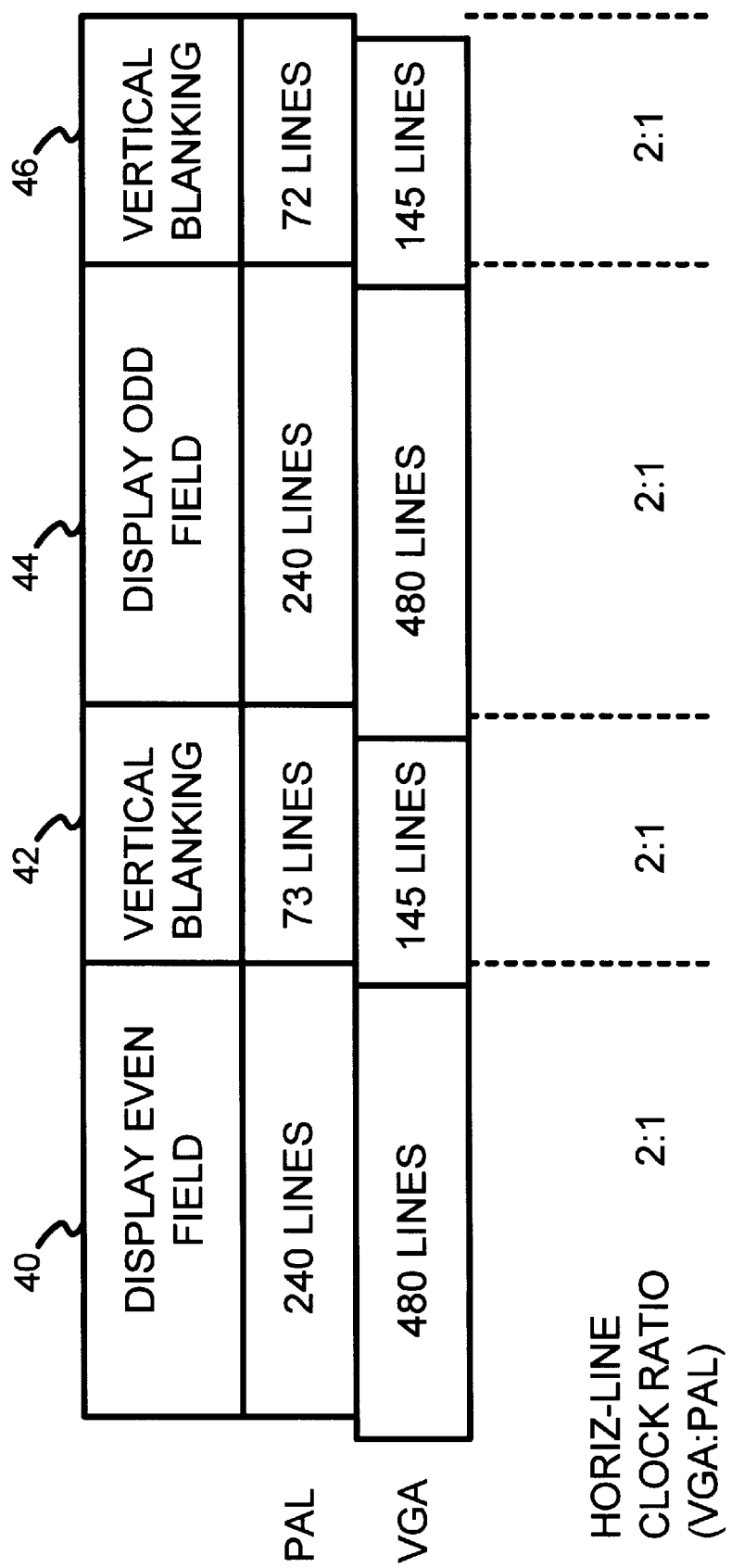
FIG. 3 is a diagram of the display and blanking periods for two VGA frames being converted to one PAL-TV frame.
Figure 4:
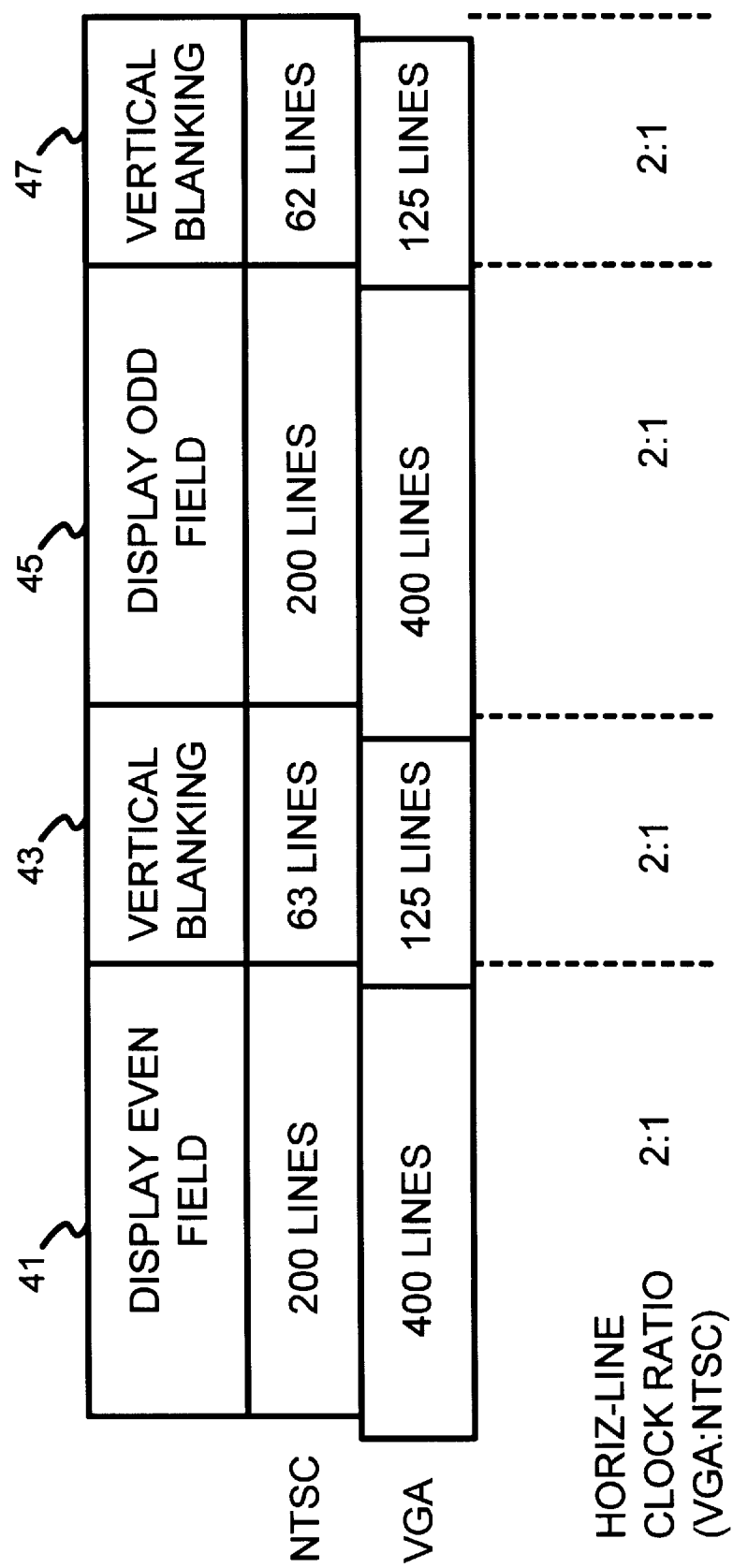
FIG. 4 highlights conversion from VGA to NTSC-TV with a loss of VGA data.

Scan conversion from VGA to PAL-TV was fairly simple because the ratios of the VGA and PAL standards have a 2:1 line ratio, as FIG. 3 showed. However, the same 2:1 conversion from VGA to the NTSC standard caused a loss of 80 of the 480 VGA display lines, as shown in FIG. 4. While this may be acceptable for cheap scan converters, more sophisticated users want all lines visible on the TV.

Figure 6:
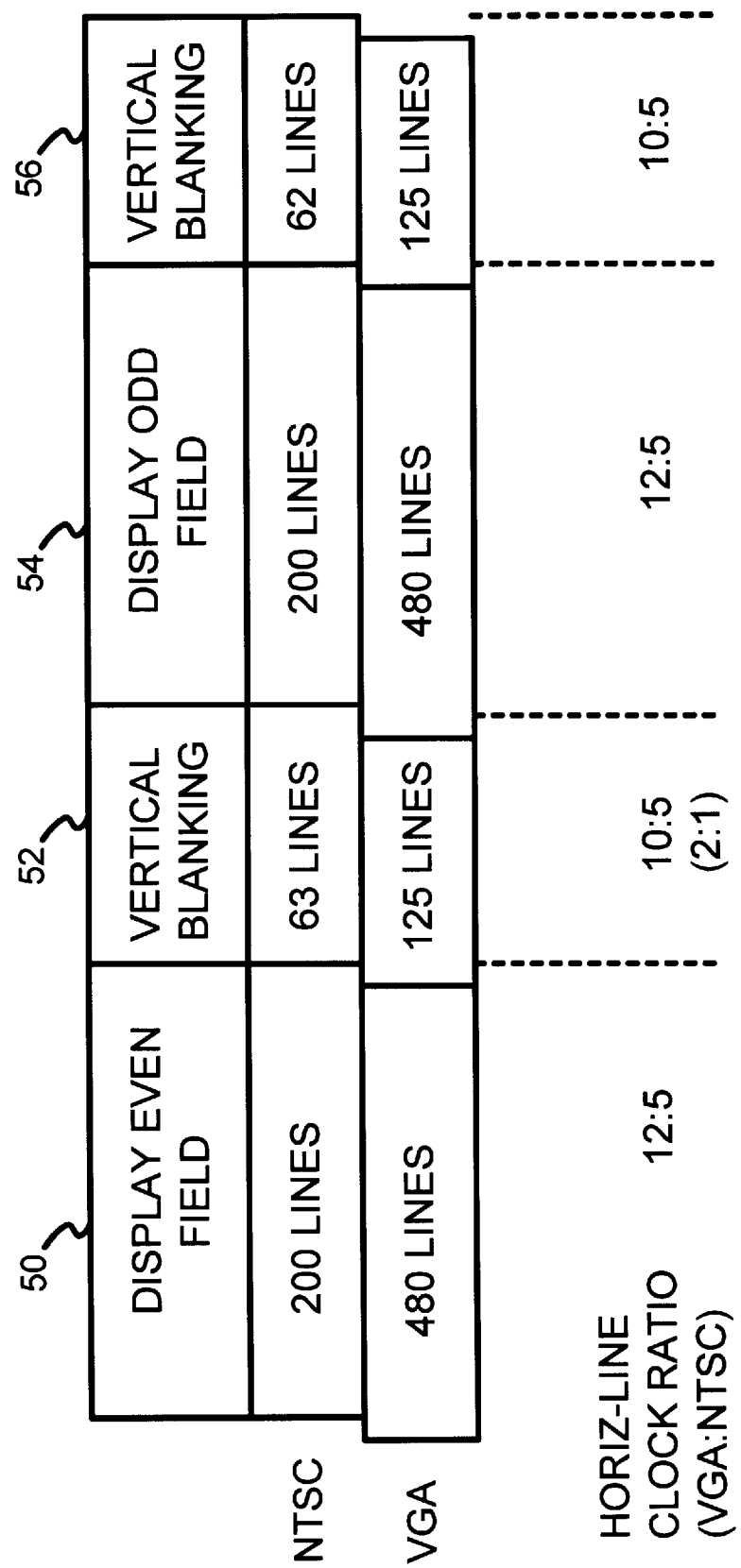
FIG. 6 illustrates scan conversion from VGA to NTSC-TV by varying the VGA's horizontal line rate during the vertical blanking period.

FIG. 6 illustrates scan conversion from VGA to NTSC-TV by varying the VGA's horizontal line rate during the vertical blanking period. Prior-art systems keep the horizontal line rate constant so that horizontal synch with the CRT is maintained. In contrast, the invention changes the horizontal line rate during the vertical blanking period. Varying the line rate during blanking allows the VGA timing to more closely match the TV timing, simplifying scan conversion. The line rate of TV lines is kept constant since the external TV monitor requires constant-frequency signals.

When the 480 displayable VGA lines are being written, 12 VGA lines are written for every 5 TV lines. However, during vertical blanking periods, 10 VGA lines are written for every 5 TV lines. Thus the rate of VGA lines is decreased during vertical blanking: for every 5 TV lines, 12 VGA lines are written during display periods 50, 54, but only 10 VGA lines are written during vertical blanking periods 52, 56. Thus the line ratio is 12:5 during display periods 50, 54, but only 10:5 during blanking periods 52, 54.

A 12:5 ratio of display lines is desirable because VGA uses 480 display lines, while NTSC uses 200 display lines per field. The ratio of 480 to 200 reduces is 12 to 5, the ideal display line ratio. If this ratio were continued during vertical blanking times, then the 63 NTSC lines during odd vertical blanking period 52 would require 63 * 12/5=151.2 VGA lines. Besides being a fractional number, 151.2 lines is more than usual for VGA vertical retrace. Instead, the 12:5 ratio is reduced to 10:5, so only 125 VGA lines are required during vertical blanking periods 52, 56.

HORIZONTAL RATE DECREASED BY INCREASING PIXELS PER LINE DURING BLANKING—FIG. 7

FIG. 7 highlights that the horizontal line rate is decreased during vertical blanking by increasing the total number of pixels per line during vertical blanking. During display periods 50, 54 when vsync is low, each VGA horizontal line has 750 total pixels. However, during vertical blanking periods 52, 56 when vsync is high, each VGA line has 900 total pixels. Since the pixel clock rate remains constant, VGA lines during vertical blanking periods 52, 56 require more time to complete, as 150 additional pixels are written before the horizontal line is finished and the next horizontal line begins. An additional 150 pixel-clock periods increase the horizontal line period. A 28.322 MHz pixel clock is used in this example.

The VGA standard defines only 640 displayable pixels per line. Additional pixels are included at the end of each horizontal line to allow time for horizontal re-trace. The additional pixels are not displayed but are blanked out. These blanked pixels do not have to be stored in video memory and are merely place-holders for timing purposes. During display periods 50, 54, each VGA line has 640 displayable pixels followed by 110 non-displayable pixels for a total of 750 pixels. However, during vertical blanking periods 52, 56, each VGA line has a total of 900 pixels. Since no pixels are displayed during vertical blanking, none of the 900 pixels are displayed. All are dummy pixels.

FIGS. 8A, 8B show how VGA lines can be filtered in a 12:5 ratio to generate NTSC-TV lines. FIG. 8A shows the conversion of VGA lines during the even field. VGA lines 1 and 2 are combined by averaging together pixels, or deleting one of the line's pixels at each position to form TV line 1. Horizontal filtering to reduce the number of pixels in the line is typically performed first. VGA lines 3 and 4 produce TV line 3, while VGA lines 5, 6 produce TV line 4. VGA lines 8,9, and 10, 11 form TV lines 7, 9, respectively. Thus VGA lines 1 to 12 generate 5 TV lines, a 12:5 ratio.

FIG. 8B shows conversion of VGA to the odd field TV lines. VGA lines 2,3 for TV line 2, VGA lines 4,5 for TV line 4, VGA lines 6,7 form TV line 6, VGA lines 9,10 for TV line 8, and VGA lines 11, 12 form TV line 10. Thus for the odd field, 12 VGA lines form 5 VGA lines, a 12:5 line ratio.

Note that VGA lines 2–6, and 9–11 are used to form both even and odd-field TV lines, while VGA lines 1, 8 are used only for even-field lines while VGA lines 7, 12 are used only to generate odd-field TV lines. The pattern is repeated every 12 VGA lines and every 10 TV lines.

SVGA CONVERSION TO NTSC—FIGS. 9, 10

Figure 9A:
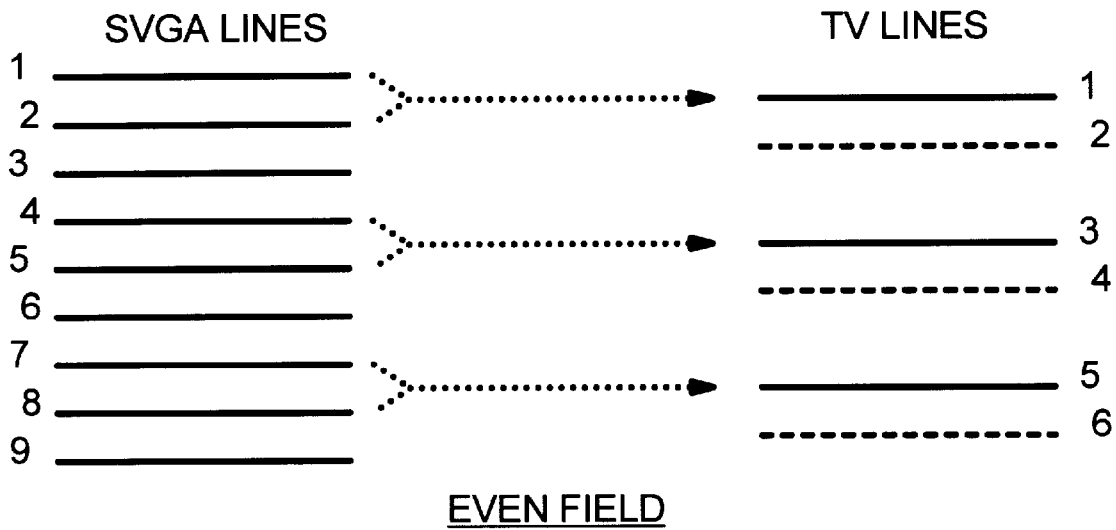
FIGS. 9A, 9B show conversion of SVGA to NTSC-TV for the even and odd fields.

Super-VGA (SVGA) is an 800×600 standard with 600 displayable lines of 800 displayable pixels each. Since NTSC-TV requires 200 displayable lines per field, a 3:1 ratio is required. FIG. 9A shows conversion of SVGA to NTSC-TV for the even field. SVGA lines 1, 2 are combined to generate TV line 1, while SVGA lines 4, 5 and 7, 8 form TV lines 3, 5, respectively. SVGA lines 3, 6, 9 are skipped completely in the even field.

Figure 9B:
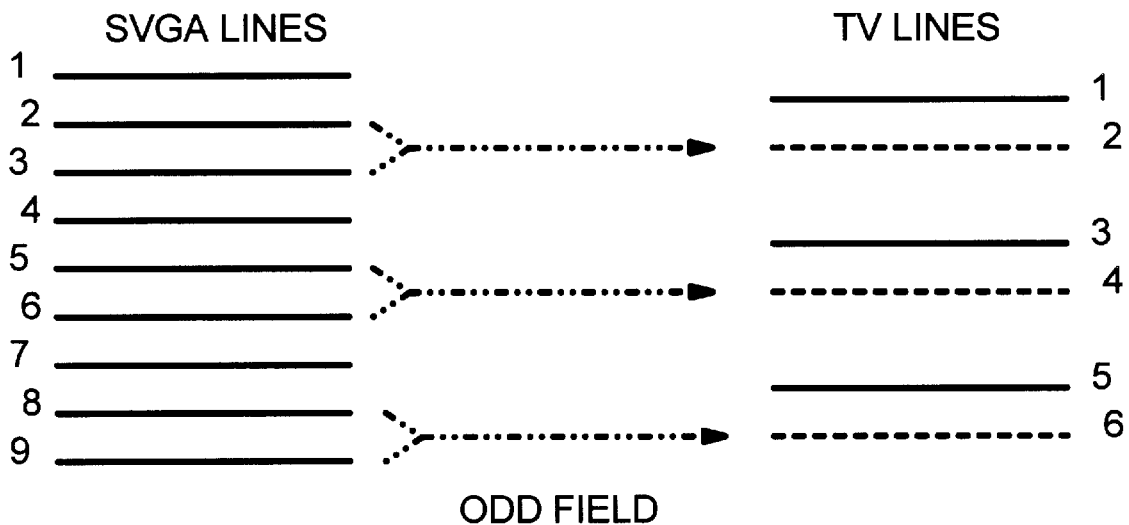

FIG. 9B illustrates conversion of SVGA to NTSC for the odd field. SVGA lines 2,3 form TV line 2, while SVGA lines 5, 6 and 8,9 form TV lines 4, 6, respectively. SVGA lines 1, 4, 7 are skipped completely in the odd field. SVGA lines 2, 5, 8 are used for both even and odd fields, while SVGA lines 1, 3, 4, 6, 7, 9 are used by only one of the fields. A ratio of 3 SVGA lines to every TV line is maintained, and the pattern repeats after every 3 SVGA lines.

Figure 10:
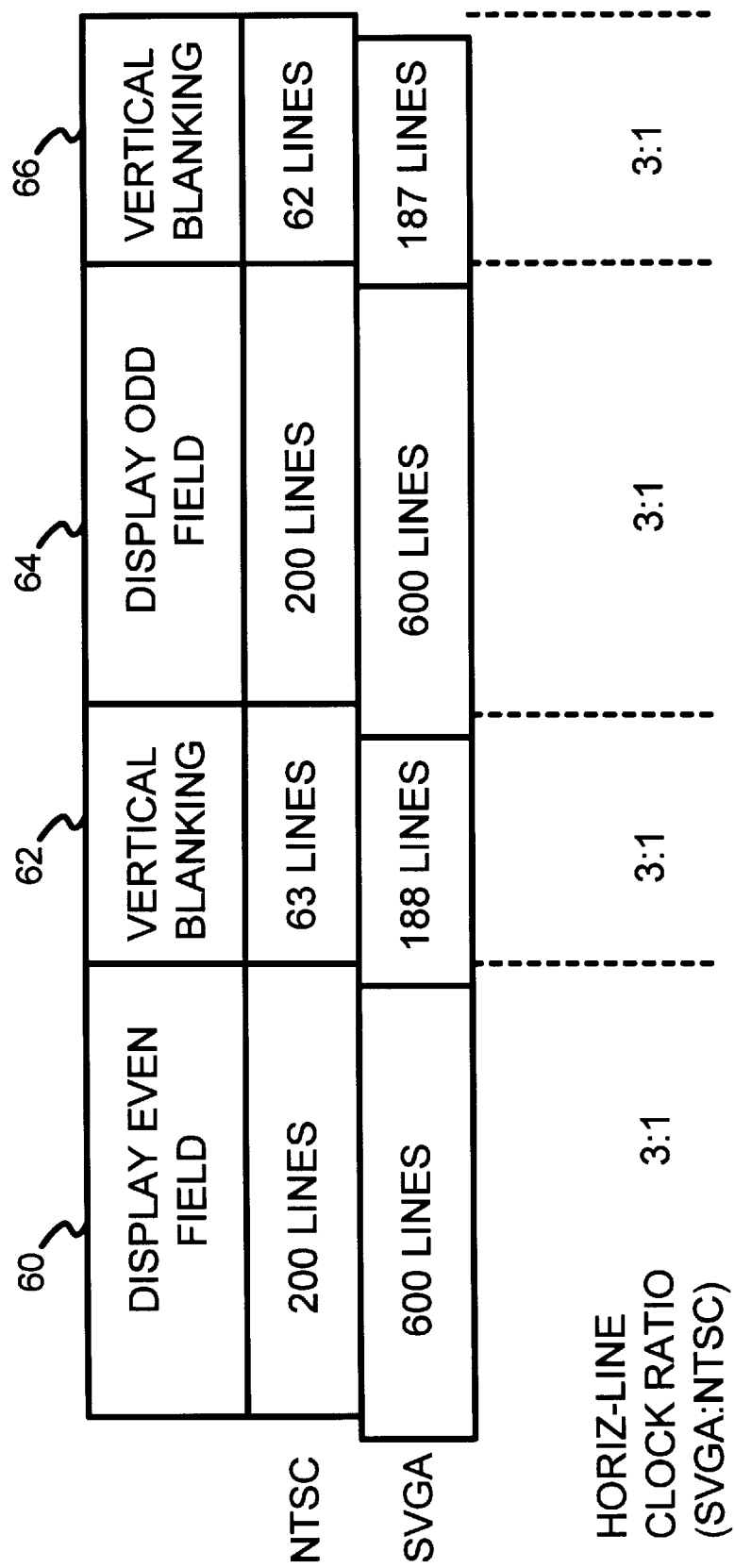
FIG. 10 highlights the timing of scan conversion from SVGA to NTSC-TV.

FIG. 10 highlights the timing of scan conversion from SVGA to NTSC-TV. During display periods 60, 64, 600 SVGA lines are converted to 200 NTSC-TV lines for each TV field. During even vertical blanking period 62, 63 TV lines and 188 SVGA lines are written. These are dummy lines since pixels are blanked during vertical blanking. During odd vertical blanking period 66, 62 TV lines and 187 SVGA lines are written.

A constant line ratio of 3:1 is maintained during both display periods 60, 64 and blanking periods 62, 66. While 188 SVGA lines during vertical blanking is higher than normal, it is not unreasonably high.

Even vertical blanking field 62 has one more SVGA line (188 lines) than does odd vertical blanking field 66, which has 187 lines. A standard SVGA graphics controller always generates the same number of lines for each frame. Varying the number of lines in a frame could cause a CRT to lose vertical synchronization and cause the picture to roll diagonal bands across the screen or display other irregularities. Thus current controllers do not allow a different number of lines for different frames.

The inventor has realized that when an external TV is connected to a portable PC, that an external CRT is not likely to also be connected. Thus it can be assumed than no external CRT is connected when scan conversion is performed. Stringent sync timing can be violated since the portable computer's flat-panel display is a digital device not requiring constant-frequency synch pulses.

EVEN FIELDS RECEIVE ONE MORE SVGA LINE

The total number of SVGA lines per frame could be re-programmed after every frame, but precisely timing the re-programming of the SVGA registers is difficult. The inventor has added hardware to the graphics controller to increase the total number of SVGA lines by one line for every other frame. Thus when the SVGA registers are programmed for a total of 787 lines (600 displayable lines and 187 non-displayed lines), every other frame receives one additional line, or 788 lines. Even fields receive 788 lines, while odd fields receive 787 lines. Even vertical blanking period 62 therefore receives 188 SVGA lines, while odd vertical blanking period 66 receives 187 SVGA lines.

With the additional SVGA line in the even field, a constant 3:1 line ratio can be maintained during both display and blanking periods. Each SVGA line is programmed to have 800 displayable pixels and a total of 848 pixels, using a pixel clock of about 40 MHz.

SVGA TO PAL SCAN CONVERSION—FIGS. 11, 12

Figure 11A:
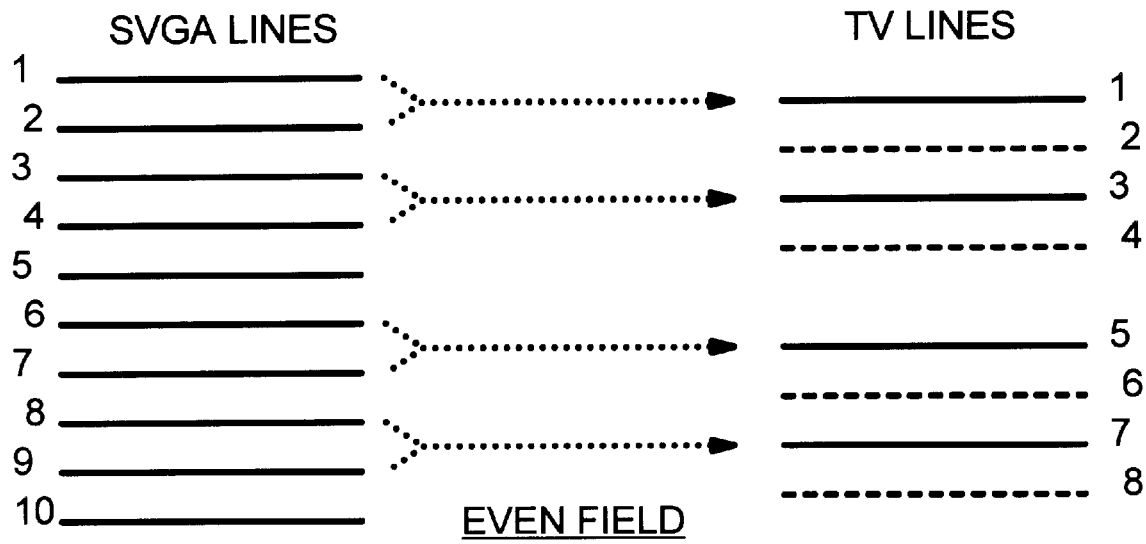
FIGS. 11A, 11B are diagrams of line conversion from SVGA to PAL-TV for the even and odd fields.

The international PAL standard does not have a simple integer SVGA line ratio as NTSC did. FIG. 11A is a diagram of line conversion from SVGA to PAL-TV for the even field. SVGA lines 1,2 form TV line 1, while SVGA lines 3, 4 form TV line 3. TV lines 5 and 7 are formed by averaging pixels in lines 6,7 and 8,9 respectively. Thus 10 SVGA lines are converted to 4 TV lines, a 5:2 ratio.

Figure 11B:
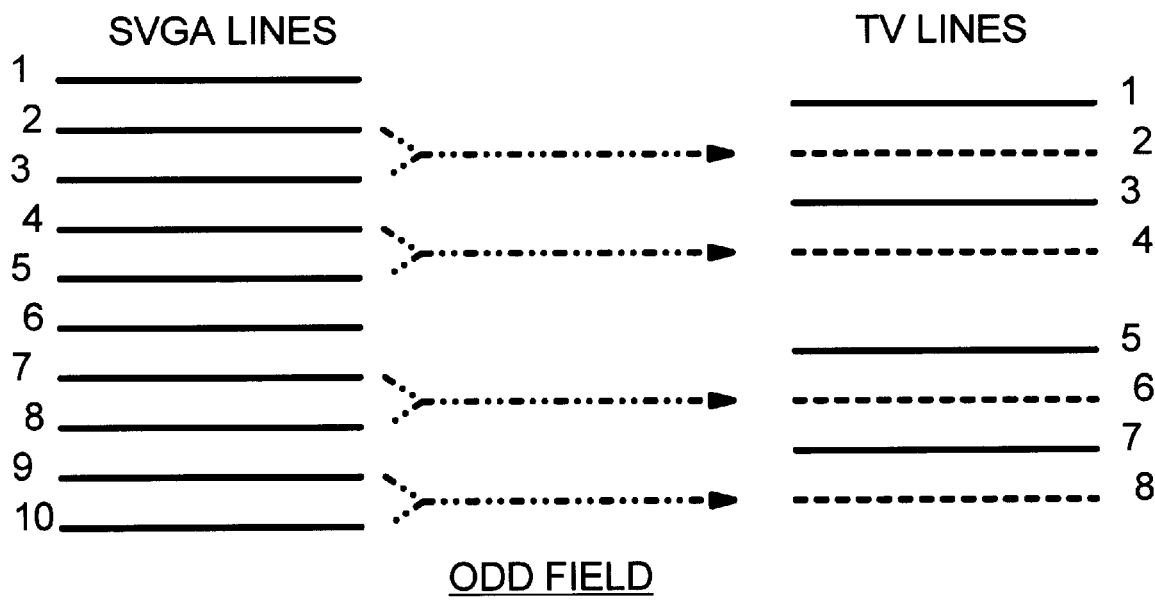

FIG. 11B is a diagram of line conversion from SVGA to PAL-TV for the odd field. SVGA lines 2,3 form TV line 2, while SVGA lines 4,5 form TV line 4. TV lines 6 and 8 are formed by averaging pixels in lines 7,8 and 9,10 respectively. The patter repeats every 5 SVGA lines. SVGA lines 1, 5, 6, 10 are used for only one field and not the other field, while lines 2–4 and 7–9 are used for both fields.

Figure 12:
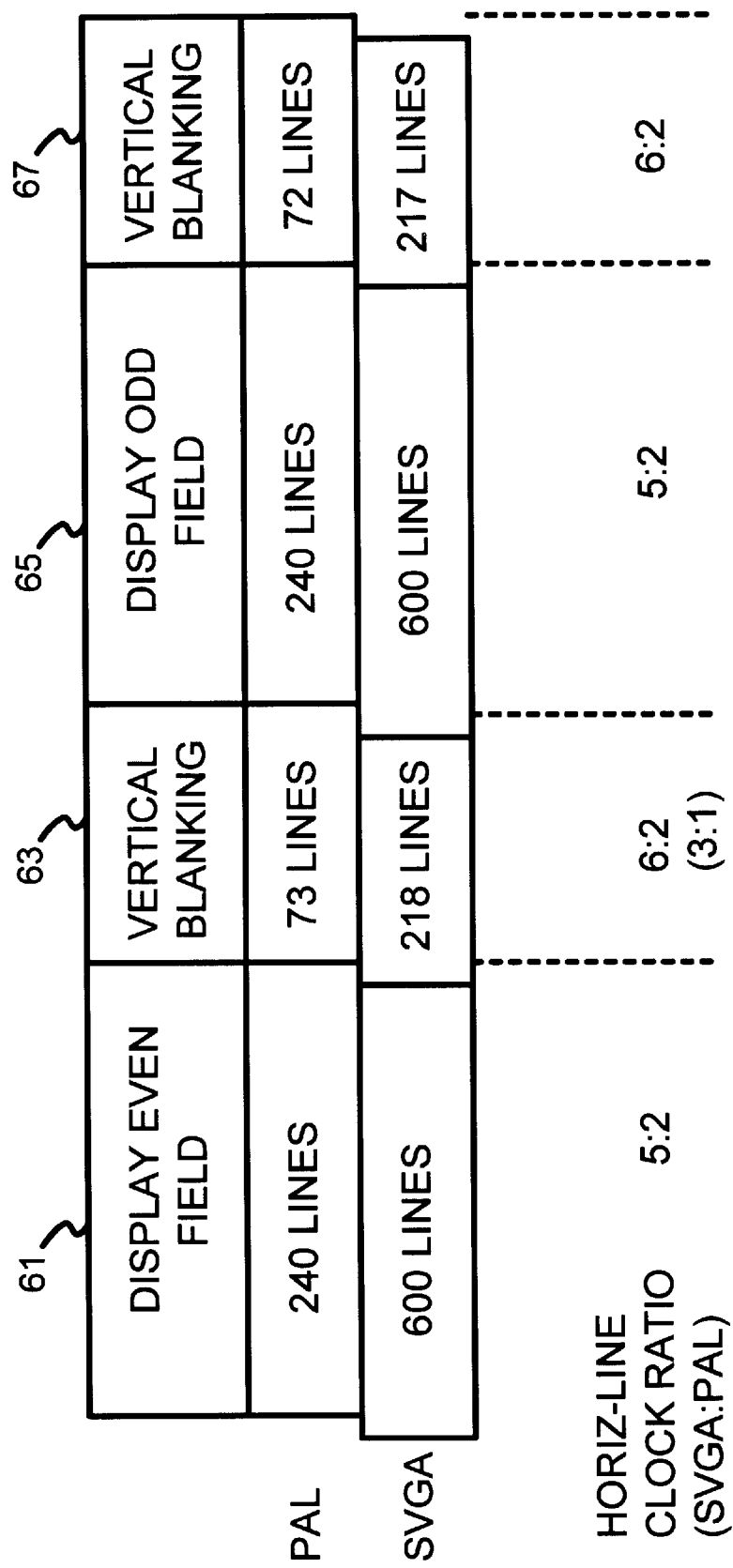
FIG. 12 is a diagram of SVGA to PAL-TV conversion with a variable line ratio during vertical blanking and an extra SVGA line for even fields.

FIG. 12 is a diagram of SVGA to PAL-TV conversion with a variable line ratio during vertical blanking and an extra SVGA line for even fields. The pixel clock is reduced slightly from 42 to 40 MHz for this example. During display periods 61, 65, 600 SVGA lines are converted to 240 TV lines, a 5:2 ratio. However, a higher line ratio of 6:2, or 3:1 is used during vertical blanking periods 63, 67. The higher line ratio better matches the TV timing required. During display periods 61, 65, each SVGA line has 800 displayable pixels and a total of 1075 pixels. The total number of pixels per line is reduced to 896 for blanking periods 63, 67 to increase the line ratio from 5:2 to 6:2. The higher line ratio during vertical blanking is thus caused by reducing the number of pixels per SVGA line, increasing the number of SVGA lines during the fixed vertical blanking period defined by the constant TV timing.

While for SVGA-to-PAL, the line ratio was increased during blanking by decreasing the number of pixels per line, the opposite was done for VGA-to-NTSC conversion. FIGS. 6 and 7 showed that the line ratio was decreased during blanking by increasing the number of pixels per line. Thus either increasing or decreasing the line ratio is possible. Arbitrary conversions can be performed by determining the line ratio during display periods, then adjusting the number of pixels per line during blanking to get the desired blanking time period.

SCAN CONVERTER INTEGRATED IN GRAPHICS CONTROLLER—FIG. 13

While the scan converter could be a separate system, it is desired to integrate it with the graphics controller. Integrating the scan converter into the pixel pipeline, rather than just attaching it to the end of the graphics pipeline has benefits. Some of the logic may be shared: for example, the digital-to-analog converter (DAC) used to convert binary pixels to analog voltages for the external CRT can also be used as the TV encoder. Some of the clock-generation logic and sync-signal generation can be shared as well.

Figure 13:
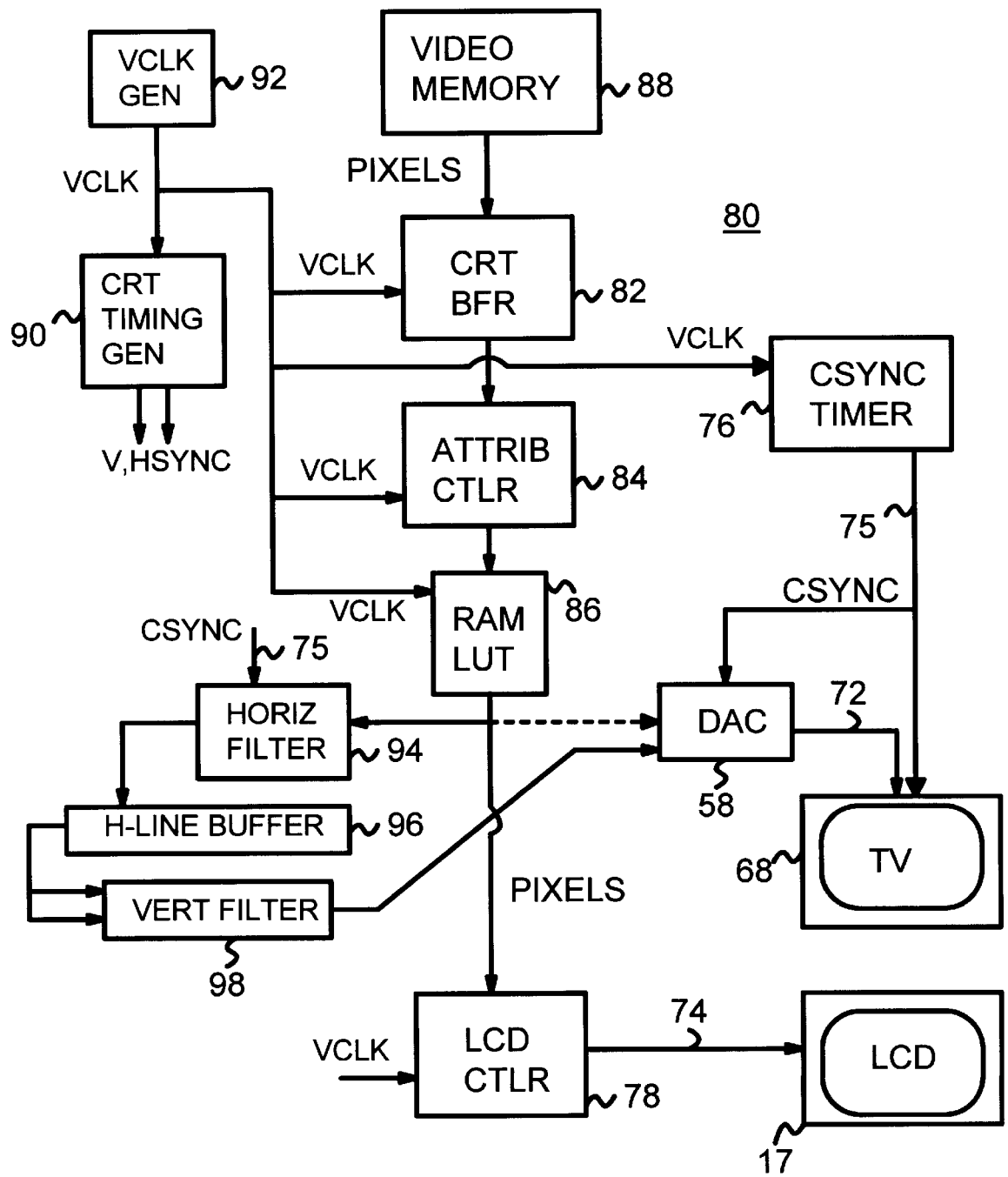
FIG. 13 is a diagram of a graphics controller with a TV scan converter for simultaneously displaying an image on a flat-panel display and an external TV.

FIG. 13 is a diagram of a graphics controller with a TV scan converter for simultaneously displaying an image on a flat-panel display and an external TV. A host interface (not shown) is coupled to a host bus in the portable PC, such as the PCI bus. Commands and graphics data are received from the PC's main processor over PCI bus by the host interface. Graphics data, such as pixels for display on the screen, are transferred from the host interface to video memory 88 where they are stored. Video memory 88 contains a pixel or bit map of the entire display screen which is continuously transferred pixel-by-pixel to the display screen as a screen refresh.

During a screen refresh, all the pixels displayed on the screen are fetched from video memory 88 and serially transferred to flat-panel display 17 and external TV 68. The pixels are arranged in horizontal lines as is well-known in the art. CRT buffer 82 is a FIFO buffer which receives pixels from video memory 88 in parallel and transfers them serially to attribute controller 84, which alters attributes to produce effects such as reverse video or blinking. RAM lookup table 86 re-maps the color of the pixels, allowing for a larger virtual palette of colors for a limited number of bits in a pixel. The re-mapped pixels are converted from digital format to analog voltages by digital-to-analog converter (DAC) 58, and the red, green, and blue color components are transmitted to external TV 68 over external cable 72 as analog voltages. RAM lookup table 86 and DAC 58 are usually integrated together as a RAMDAC.

When an external CRT rather than external TV 68 is connected, then DAC 58 converts digital pixels to the color components for a CRT. However, when external TV 68 is connected, DAC 58 is re-programmed to convert pixels to a format used by external TV 68. DAC 58 operates as a TV encoder using composite-sync signal 75 to properly time the output of the R, G, B, components.

Re-mapped pixels from RAM lookup table 86 are also transmitted to LCD controller 78, which re-formats the pixels for display on flat-panel display 17, which has a wide digital interface 74. Often the timing of pixels must be altered for transfer to flat-panel display 17. Indeed, the timing and formatting requirements for flat-panel displays differs enough from CRT timing that separate panel control registers are programmed to generate the correct panel timings.

The host interface (not shown) also receives commands from software such as display drivers executing on the PC's microprocessor. The host interface receives read and write commands and write data which over-writes internal configuration registers on the graphics controller chip. These configuration registers include CRT control registers which specify the horizontal and vertical refresh or synchronization rates, and the number of pixels per line. Panel registers contain additional panel-specific configuration data, such as frame clock rate, blanking, and half-frame configurations.

These configuration registers include clock multipliers and divisors which determine the frequency of the pixel of video clock VCLK, which is generated by VCLK generator 92. Often an internal phase-locked loop (PLL) is used to generate a stable clock, with counters on the base-clock input and feedback to the PLL to multiply and divide the clock's output frequency. The counters are programmed with a predetermined multiplier and divisor values to obtain a desired VCLK frequency.

Pixel clock VCLK or a derivative is transmitted to the pixel-transfer pipeline to control the timing of pixel transfer in the pipeline. CRT buffer 82, attribute controller 84, and RAM lookup table 86 receive VCLK to synchronize pixel transfer through these stages. LCD controller 78 also receives a derivative of VCLK.

The horizontal and vertical timing signals are generated from VCLK by CRT timing generator 90. The signals include the horizontal synch signal hsync and the vertical sync signal vsync, which indicate to a CRT when to re-trace the electron beam to the beginning of the next line, or to the first line on the screen. Since re-trace occurs during blanking periods, hsync and vsync indicate when the horizontal and vertical blanking periods are. These signals may be modified somewhat to generate the line and frame clock to flat-panel display 17 and other signals required by a flat-panel display but not by a CRT. CRT timing generator 90 is modified from a standard timing generator to accommodate scan conversion, as is explained later for FIG. 14.

TV timing generator 76 generates composite sync signal 75 (csync) to external TV 68. The composite sync is used by a TV to time the writing of pixels to the display tube. CSYNC is a composite signal generated from hsync and vsync.

Composite sync signal 75 is also used for filtering pixels during scan conversion. Horizontal filter 94 receives a stream of pixels from RAM lookup table 86 as these pixels are being transferred to LCD controller 78 for simultaneous display on flat-panel display 17. Horizontal filter 94 reduces the number of displayable pixels in a horizontal line from 640 for VGA, or 800 for SVGA, to the 640 displayable pixels for NTSC-TV, or 640 displayable pixels for PAL-TV. Horizontal filter 94 may average the color components of two or more adjacent VGA pixels to generate one TV pixel, or it may simply delete enough VGA pixels to produce the required number of TV pixels. The TV pixels generated by horizontal filter 94 are stored in horizontal-line buffer 96, which contains enough storage for two horizontal lines of TV pixels. Since horizontal-line buffer 96 only stores two lines, it is much less expensive than a full-frame buffer, which stores all 200 or 240 TV lines.

Vertical filter 98 receives two full horizontal lines from horizontal line buffer 96. Vertical filter 98 merges the two horizontal lines to form just one line, reducing the number of horizontal lines to meet the number of lines required by external TV 68. The two lines are reduced to one line by vertical filter 98 selecting TV pixels from either the current line from horizontal filter 94, or from the previous line from horizontal filter 94. Vertical filter 98 either selects all the pixels from one line, or selects some pixels from the previous line and other pixels from the current line. Vertical filter 98 can alternately average pixels from each line into new pixels. The filtered TV pixels are then sent from vertical filter 98 to DAC 58 for encoding and conversion from digital to analog format.

Vertical filtering combines two VGA lines to form one TV line. FIGS. 2, 8, 9, and 11 illustrated which lines are combined for the vertical filtering performed by vertical filter 98. Other vertical filtering schemes could also be used.

A pipeline delay may be introduced by filtering, causing the display on external TV 68 to be perhaps one or two horizontal lines behind the display on flat-panel display 17. This is a relatively minor delay, as one line in a display of 200 lines is only half of one percent of the screen. Thus even with this slight delay, the images appear to be simultaneously refreshed as the same image frame is being written to both flat-panel display 17 and to external TV 68 at the same time.

HARDWARE TO VARY HORIZONTAL RATE—FIG. 14

Figure 14:
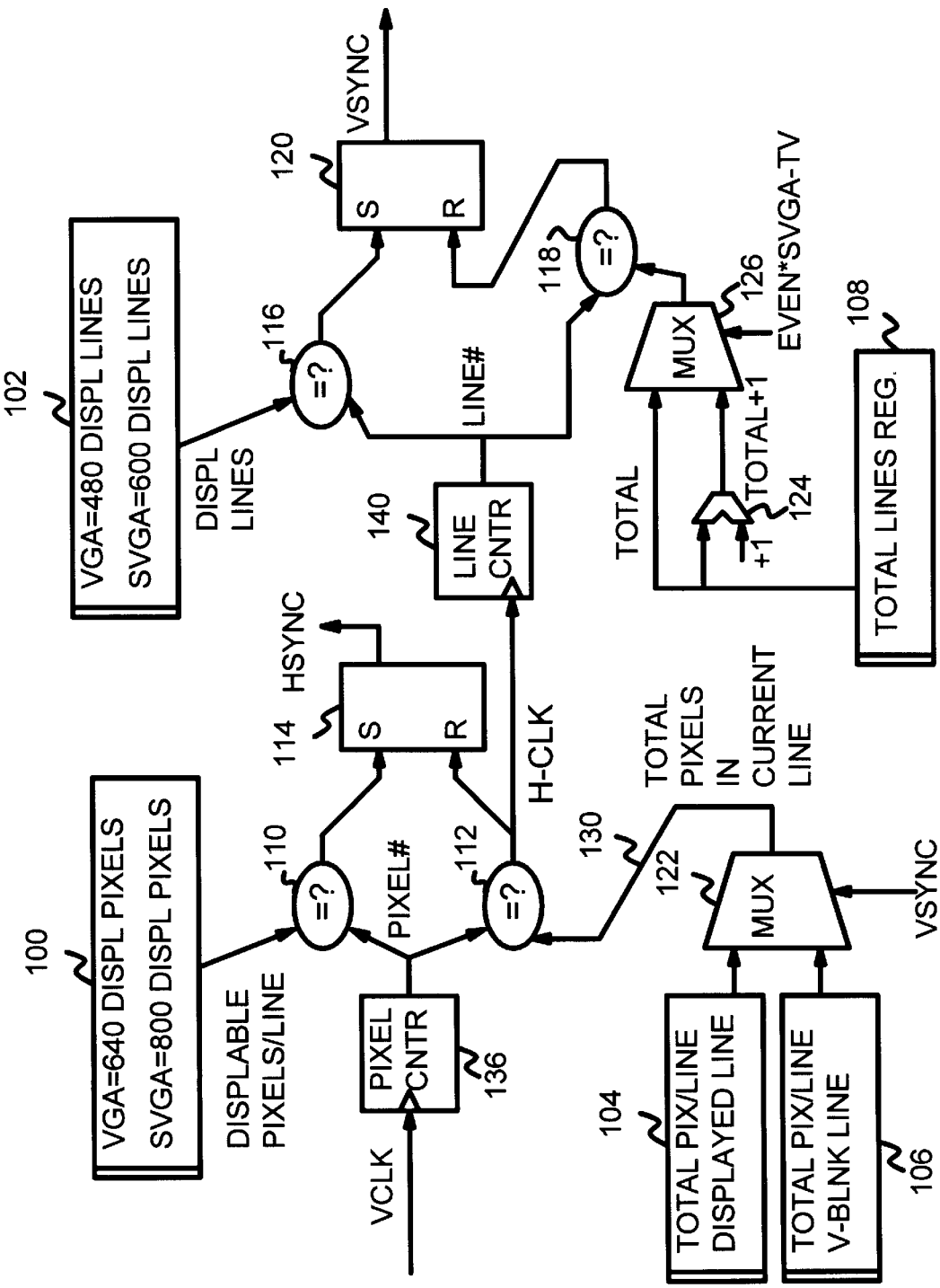
FIG. 14 is a diagram of the CRT timing generator of FIG. 13 which changes the line rate by adjusting the total number of pixels in lines during the vertical blanking period.

FIG. 14 is a diagram of CRT timing generator 90 of FIG. 13 which changes the line rate by adjusting the total number of pixels in lines during the vertical blanking period. The horizontal synch signal hsync and vertical sync signals vsync are used by an external CRT to blank pixel display during re-trace. These sync signals in their exact form are not used by most flat-panel displays, but the signals are nevertheless generated when no external CRT is attached. The sync signals are used as intermediate signals which are later converted to clock signals required by the flat-panel display.

The pixel clock VCLK is received and divided down to generate the hsync and vsync signals. Programmable registers are written with configuration information by display driver software for the current resolution (VGA, SVGA) and color depth. Even for a specific resolution such as VGA, the exact timing can be varied. For example, the overall vertical refresh rate can be set to 60 Hz for older displays, or higher to 75 Hz or 80 Hz for reduced flicker. While the number of pixels and lines which are displayed should not be changed, the number of non-displayed pixels in a line, and the number of lines during vertical blanking can be changed within the VGA or SVGA standards.

TIMING CONFIGURATION REGISTERS

PC-graphics configuration registers include:
Displayed Pixels per line (register 100)
Displayed Lines (register 102)
Total Pixels in a Displayed Line (register 104)
Total lines (register 108).

An additional register is used to adjust the PC-graphics timing for scan conversion:
Total Pixels in a Blanked Line (register 106).

Preferable values programmed into these registers for VGA or SVGA scan-conversion to PAL and NTSC-TV are shown in Table 1.

TABLE 1

| | | Configuration Registers | | | |
|---|---|---|---|---|---|
| Register | No. | VGA-to-NTSC | VGA-to-PAL | SVGA-to-NTSC | SVGA-to-PAL |
| Displayed Pixels | 100 | 640 | 640 | 800 | 800 |
| Displayed Lines | 102 | 480 | 480 | 600 | 600 |
| Total Pixels for Displayed Line | 104 | 750 | 906 | 848 | 1075 |
| Total Pixels for Blanked Line | 106 | 900 | 906 | 848 | 896 |
| Total Lines | 108 | 605 | 625 | 787+ | 817+ |

Registers 100, 102 are defined by the standard resolution, VGA or SVGA. Register 100 contains the number of displayable pixels per line, which is 640 for VGA, or 800 for SVGA. Register 102 contains the number of displayable lines, which is set to 480 lines for VGA, or 600 lines for SVGA.

Register 108 contains the total number of lines in a frame, which include the 480 or 600 displayable lines from register 102. The total number of lines in a frame is larger than the displayable lines because dummy lines occur when vertical re-trace is performed. These dummy lines are not displayed but are blanked out. An additional 100 to 200 lines are added for the re-trace or vertical blanking period.

Register 104 contains the total number of pixels in a displayed line. The total number of pixels includes the displayed pixels (640 or 800) and non-displayed "dummy" pixels at the end of each line, when horizontal re-trace is performed. An additional 50 to 200 dummy pixels are added to each line.

SECOND REGISTER FOR TOTAL PIXELS DURING VERTICAL BLANKING

Register 106 contains the total number of pixels for a non-displayed line during vertical blanking. In prior-art graphics systems, a separate register 106 was not provided since the total number of pixels in each line had to be constant so that a constant-frequency hsync signal is generated.

TIMING COUNTERS/DIVIDERS

The pixel clock VCLK clocks pixel counter 136, which indicates the number of pixels transferred in the current horizontal line. Each clock pulse of VCLK corresponds to one pixel being transferred to the display, and each VCLK pulse increments the pixel count in pixel counter 136.

Comparator 110 receives the number of displayable pixels per line, 640 or 800, from register 100 and compares it to the current pixel count. When the pixel count from pixel counter 136 reaches the number of displayable pixels programmed into register 100, then comparator 110 sends a set pulse to S-R latch 114, setting or activating the horizontal synch signal hsync. The horizontal re-trace or blanking period begins after the last displayable pixel is transferred, when hsync is set by comparator 110.

Comparator 112 compares the pixel count from pixel counter 136 to the programmed total number of pixels in the current line, which is received from bus 130 from mux 122. When the pixel count equals the total number of pixels in the current line, then the current line has completed and the next horizontal line can begin. Comparator 112 sends a reset pulse, HCLK, to S-R latch 114, resetting or de-activating the hsync signal, thus ending the horizontal blanking period for the current line. Pixel counter 136 is also reset by reset pulse on HCLK from comparator 112. Pixel counter 136 then increments with each VCLK as pixels in the following line are transferred.

Each pulse of HCLK indicates that a new horizontal line is beginning. Thus HCLK is a horizontal line clock signal and is used to increment line counter 140. Line counter 140 indicates the number of horizontal lines of pixels which have been transferred to the display. When the number of lines equals the number of displayable lines programmed into register 102, then comparator 116 generates a set pulse to S-R latch 120. The set pulse activates vsync, indicating that the vertical blanking period has begun. All pixels in all lines during the vertical blanking period are blanked out by the CRT or flat-panel display and thus are prevented from being displayed.

Comparator 118 receives the line count from line counter 140 and compares the line count to the total number of lines in the frame, which is output from mux 126. When the line count equals the total number of lines, then the current frame has completed display and vertical re-trace, and the next frame can begin display with the first horizontal line. A match from comparator 118 generates a reset pulse to S-R latch 120, de-activating vsync and ending the vertical blanking period. The reset pulse can also be used as a vertical or frame clock to a flat-panel display.

ADDITIONAL LINE FOR EVEN FRAMES

As shown in FIGS. 10 and 12, an additional horizontal line is provided for SVGA scan-conversion. This additional horizontal line is generated during the vertical blanking period. Adding a line causes the vertical sync frequency to vacillate between two frequencies—one frequency corresponding to a period of TOTAL lines, and the other frequency corresponding to a period of (TOTAL+1) lines. This frequency vacillation is completely unacceptable for a CRT since the CRT's vertical synch could be lost. However, such as frequency variation is acceptable for many flat-panel displays, although perhaps not all flat-panel displays may accept the variation.

The total number of lines in a frame is programmed into register 108. This total number of lines is transmitted to comparator 118 through mux 126 for all modes except for SVGA-to-TV scan conversion.

Incrementer 124 increments the total number of lines from register 108 by one, to generate (TOTAL+1). Multiplexer or mux 126 selects (TOTAL+1) for odd frames when SVGA scan conversion is enabled. Mux 126 selects the total from register 108 for even frames. Comparator 118 generates the reset pulse to S-R latch 120 one line later for odd frames because TOTAL+1 rather than TOTAL is received from mux 126 during odd SVGA-to-TV frames. Thus mux 126 causes one extra line to be included for every other frame.

DIFFERENT LINE LENGTH DURING VERTICAL BLANKING

Two registers are provided for the total number of pixels in a line. Non-displayable lines during vertical blanking have the total number of pixels defined by register 106, while displayable lines use register 104.

Register 104 is programmed with the total number of pixels in a standard, displayed line. However, register 106 is programmed with the total number of pixels in a blanked line, during vertical blanking. The vertical blanking period occurs when the vertical synch signal vsync is high or active. Mux 122 selects the total number of pixels from register 104 when vsync is low, but selects from register 106 when vsync is high.

Comparator 112 receives the total pixel count from mux 122 on bus 130. This total pixel count can differ for standard display lines and blanked lines. Changing the number of pixels or length of a line also changes the amount of time the line is active, the time-period of the line. Reducing the number of pixels in a blanked line is accomplished making register 106 have a lower value than register 104. Fewer pixels in blanked lines increases the rate that lines are generated. Since the rate of TV lines is kept constant, the higher rate of PC-graphics lines increases the ratio of VGA or SVGA lines to TV lines. The line ratio can also be decreased by making the total pixel count in register 106 be higher than the total pixel count in register 104. An arbitrary line ratio can be achieved by programming a different total pixel value into register 106.

ADVANTAGES OF THE INVENTION

Scan conversion is facilitated by allowing the system designer to specify different numbers of pixel for displayable and blanked lines. The line ratio during display periods can be optimized for display of all PC-graphics lines during the time that the TV lines must be generated. The line ratio can increase or decrease during vertical blanking to more closely match the blanking periods of the PC-graphics display and the external TV. Flexibility is introduced by separately specifying the line length during blanking, allowing blanking periods to be separately optimized from display periods.

A different number of PC-graphics lines can be generated for different frames, to better match the asymmetry of the even and odd fields of TV standards. More complex asymmetries could also be devised for arbitrarily complex scan conversions. Scan conversion is no longer limited to simple line ratios, or the use of expensive full-frame buffers and complex sequencing logic. The invention provides a low-cost scan converter using relatively simple logic and a small line buffer.

Integrating the scan converter with the graphics controller brings many benefits. The PC-graphics controller can be configured to better fit scan conversion ratios, reducing image-distortion and image-loss problems. TV over-scan is compensated for by the hardware, freeing the PC user to use all the display area.

Simultaneous refresh of both the external TV and the flat-panel display allows the PC user to use the local flat-panel display while presenting the same image at the same time to a large audience using an external TV-compatible apparatus. The audience instantly sees the same image that the presenter sees on his laptop PC. Images and videos are quickly and simultaneously updated. The external TV could be remotely located, such as when the external TV is a link to a remote site. Then having two simultaneous, identical displays has greater importance as only one display is physically present at each site.

The unique characteristics of flat-panel displays which make them differ from CRT's have been exploited by the inventor to improve scan conversion. Traditional CRT timing must have stable frequencies, as unstable, varying frequencies cause havoc on CRT's. In a surprising twist, the inventor breaks from traditional stable sync frequencies to adjust timing within each single frame to better match scan conversion requirements. While simultaneously display with a CRT is not possible, simultaneous display with a flat-panel display is achieved using an inexpensive line buffer.

ALTERNATE EMBODIMENTS

Several other embodiments are contemplated by the inventor. For example a character clock rather than a pixel clock may be used for transferring groups of pixels through the pipeline, and for generating CRT and TV timing signals. The divisor for the character clock may be changed during vertical blanking to effectively change the line rate during blanking. Other resolutions besides VGA and SVGA can be used, such as XGA or other future high-resolution modes. Other TV standards could also be used.

The invention is particularly well-suited for future resolutions for PC and future TV standards, since the invention allows for arbitrary timing requirements and ratios of PC and TV lines.

Separate counters/dividers for displayable pixels and the total pixels could be substituted rather than using a single counter with comparators for the displayable number of pixels and the total number of pixels. While one extra line for odd fields for SVGA conversion has been shown, more lines could also be added to odd fields. The horizontal line buffer may be reduced in size from storing two horizontal lines to one horizontal line by bypassing pixels from the current line around the line buffer to the vertical filter if various timing requirements are met.

A TV monitor has been described, although other devices which use TV standards are often substituted, such as using a big-screen TV projector or a video-input device. A TV-broadcast device could even be used.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A graphics controller with an integrated scan converter for displaying a computer-generated graphics image on both a flat-panel display and an external television (TV), the graphics controller comprising:

a timing generator for generating timing signals including a horizontal timing signal and a vertical timing signal, the timing generator including:
first rate means for generating the horizontal timing signal at a first rate when transferring horizontal lines of pixels displayed to a user;
second rate means for generating the horizontal timing signal at a second rate when transferring blanked horizontal lines of pixels which are not displayed to a user;

wherein the first rate is not equal to the second rate;

transfer means for transferring horizontal lines of pixels to the flat-panel display at the first rate during a display period but for transferring blanked lines of pixels to the flat-panel display at the second rate during a blanking period;

a TV encoder for converting pixels from the transfer means to analog TV signals for display by the external TV;

a TV connector, coupled to receive the analog TV signals from the TV encoder, for coupling to the external TV;

a flat-panel-display interface, receiving the horizontal lines of pixels from the transfer means, for converting the horizontal lines of pixels for display by the flat-panel display;

wherein horizontal lines of pixels that are transferred during the display period are visible to the user, but blanked horizontal lines of pixels transferred during the blanking period are not visible to the user, whereby the horizontal lines of pixels are transferred to the flat-panel display at the first rate during the display period but are transferred at the second rate during the blanking period.

2. The graphics controller with the integrated scan converter of claim 1 wherein the horizontal lines of pixels form an image visible on the flat-panel display and a substantially identical image simultaneously visible and on the external TV, whereby the image is simultaneously visible on the flat-panel display and on the external TV.

3. The graphics controller with the integrated scan converter of claim 2 wherein the flat-panel display is a non-interlaced display but the external TV is an interlaced display;

the transfer means transferring all horizontal lines to the flat-panel display in sequence during each display period;

the external TV receiving only a first half of the horizontal lines during the display period, the external TV receiving a second half of the horizontal lines during a next display period after the blanking period when the flat-panel display overwrites all the horizontal lines, wherein each pair of horizontal lines in the first half is separated by a horizontal line in the second half.

4. The graphics controller with the integrated scan converter of claim 2 further comprising:

filtering means, receiving the horizontal lines of pixels from the transfer means, for reducing a number of horizontal lines transmitted to the external TV in the display period and for reducing a number of pixels in each horizontal line, whereby fewer horizontal lines are transferred to the external TV than to the flat-panel display for each display period.

5. The graphics controller with the integrated scan converter of claim 4 wherein the filtering means includes:

a line buffer for storing a previous horizontal line of pixels, for combining with a current horizontal line of pixels to reduce the number of horizontal lines transmitted to the external TV, whereby the line buffer is used for filtering horizontal lines to the external TV.

6. The graphics controller with the integrated scan converter of claim 5 wherein the line buffer contains a storage capacity insufficient to store all horizontal lines in the display period, whereby a full-frame buffer is not used for scan conversion.

7. The graphics controller with the integrated scan converter of claim 6 wherein the storage capacity of the line buffer is sufficient to store substantially two horizontal lines in the display period, whereby only a dual-line buffer and not a full-frame buffer is used for scan conversion.

8. The graphics controller with the integrated scan converter of claim 5 wherein the TV encoder comprises a digital-to-analog converter (DAC), the DAC also for converting the pixels to analog cathode-ray-tube (CRT) signals for displaying by an external CRT when the external TV is not connected to the graphics controller;

the graphics controller further for connecting the DAC to the external CRT, the horizontal timing signal being sent to the external CRT, whereby the DAC converts pixels for the external CRT or for the external TV.

9. The graphics controller with the integrated scan converter of claim 8 further comprising:

a composite-sync generator for generating a composite-sync signal for timing display of pixels by the external TV, the TV connector connecting the composite-sync signal to the external TV.

10. The graphics controller with the integrated scan converter of claim 9 wherein the first and second rate means together comprise:

a first register for storing a first total number of pixels in a horizontal line transferred during the display period;

a second register for storing a second total number of pixels in a blanked horizontal line transferred during the blanking period;

a pixel counter incremented for each pixel in a horizontal line transferred to the flat-panel display, the pixel counter being reset by the horizontal timing signal after each horizontal line, the pixel counter outputting a current pixel count;

a multiplexer, receiving the first total number and the second total number, for outputting the first total number during the display period, but outputting the second total number during the blanking period, the multiplexer outputting the first of the second total number as a total-pixels-in-current-line output;

a comparator, coupled to the pixel counter and to the multiplexer, for outputting the horizontal timing signal when the total-pixels-in-current-line output from the multiplexer matches the current pixel count, whereby the horizontal timing signal is generated at the first rate when transferring horizontal lines of pixels displayed to a user, but generated at the second rate when transferring blanked horizontal lines of pixels which are not displayed to a user, the first rate and the second rate determined by the first and second total number of pixels in a horizontal line stored in the first and second registers.

11. The graphics controller with the integrated scan converter of claim 10 wherein the first total number of pixels in the horizontal line transferred during the display period includes displayable pixels and non-displayed pixels.

12. The graphics controller with the integrated scan converter of claim 11 further comprising:

means for alternately adding an extra horizontal line to blanking period for every second blanking period but not for all blanking periods, wherein every second blanking period is longer in duration than other blanking periods;

whereby the extra horizontal line is added for half of the blanking periods.

13. The graphics controller with the integrated scan converter of claim 11 wherein the flat-panel display is a SVGA display with 600 lines of 800 displayable pixels per line, and wherein the external TV is selected from the group consisting of a NTSC TV with 200 displayable lines per field and a PAL TV with 240 displayable lines per field.

14. A portable personal computer (PC) comprising:

a flat-panel display for displaying a frame of horizontal lines forming an image to a user;

a TV connector for driving TV-encoded signals to an external television (TV), the external TV displaying the image in response to the TV-encoded signals;

wherein the image displayed on the flat-panel display is simultaneously displayed on the external TV;

a host processor for executing application programs and generating the image data;

a video memory, coupled to the host processor, for receiving and storing the image data;

a pixel pipeline, coupled to the video memory and to the flat-panel display, for converting the image data from the video memory and for transferring pixels from the video memory to the flat-panel display;

TV filtering means, coupled to the pixel pipeline to receive pixels being transferred to the flat-panel display, for reducing a number of displayable pixels in each line and for combining horizontal lines of pixels to output filtered lines of TV pixels to the TV connector;

a clock source outputting a graphics clock;

a timing generator, receiving the graphics clock, for generating a line signal indicating an end of each horizontal line of pixels and for generating a frame signal indicating an end of the frame of horizontal lines;

line rate adjust means, coupled to the timing generator, for altering a line frequency of the line signal during a blanking period;

wherein the line frequency is not constant but is varied during the blanking period;

the timing generator generating a vertical blanking signal indicating a display period and the blanking period;

wherein visible pixels are not transferred to the flat-panel display during the blanking period but only during the display period; and a TV timing generator, receiving the graphics clock, for generating a composite sync signal to the TV connector, for controlling and timing display of TV pixels by the external TV, the composite sync signal having a constant frequency, whereby the line frequency is not constant but is varied during the blanking period to allow for adjusting timing of the flat-panel display to meet timing of the external TV.

15. The portable PC of claim 14 wherein the line rate adjust means comprises:

a display-period total-pixel register indicating a display total number of pixels in a horizontal line during the display period;

a blanking-period total-pixel register indicating a blanking total number of pixels in a horizontal line during the blanking period;

and wherein the timing generator includes:

a counter, receiving the graphics clock, for outputting a count of transferred pixels in a current horizontal line;

line signal means for generating the line signal when the count from the counter exceeds the display total number of pixels when the display period is indicated by the vertical blanking signal, the line signal means generating the line signal when the count from the counter exceeds the blanking total number of pixels when the blanking period is indicated by the vertical blanking signal, whereby the line frequency is adjusted during the blanking period by generating the line signal after a different total number of pixels indicated by the blanking-period total-pixel register.

16. The portable PC of claim 15 wherein the pixel pipeline and the vertical blanking signal are connected to an external cathode-ray-tube (CRT) monitor, the external CRT monitor losing synchronization and not able to display the image when the line frequency is not constant;

wherein the image is simultaneously displayed on the flat-panel display and the external TV but not on the external CRT monitor when the line frequency is not constant.

17. The portable PC of claim 16 wherein the TV filtering means includes a line buffer for temporarily storing substantially one horizontal line of pixels, wherein a full-frame buffer is not used for filtering.

18. A method of displaying an image on a flat-panel display and simultaneously displaying the image on an external television (TV), the method comprising the steps of:

continuously pulsing a graphics clock at a constant frequency;

transferring pixels from a video memory through a pixel pipeline to the flat-panel display in response to and synchronized with the graphics clock;

generating from the graphics clock a composite-sync signal having a constant frequency and transmitting the composite-sync signal to the external TV;

incrementing a pixel counter as pixels are transferred through the pixel pipeline;

comparing the pixel counter to a total pixel count for a displayed line and pulsing a line clock when the pixel counter exceeds the total pixel count;

incrementing a line counter for each pulse of the line clock;

comparing the line counter to a displayable number of lines and asserting a vertical blank signal when the line counter exceeds the displayable number of lines;

when the vertical blank signal is asserted, comparing the pixel counter to a total pixel count for a blanked line and pulsing the line clock when the pixel counter exceeds the total pixel count;

comparing the line counter to a total number of lines and de-asserting the vertical blank signal when the line counter exceeds the total number of lines;

begin transferring a new frame of lines through the pixel pipeline when the vertical blank signal is de-asserted;

converting n lines of pixels to x TV lines when the vertical blank signal is asserted, but converting m lines of pixels to y TV lines when the vertical blank signal is not asserted, wherein n, m, x, and y are whole numbers.

wherein a line ratio of lines transmitted to the flat-panel display to the TV lines transmitted to the external TV is m:y during a display period when the vertical blank signal is not asserted, but n:x during a vertical blanking period when the vertical blank signal is asserted.

19. The method of claim 18 further comprising the step of:

when the flat-panel display is displaying the image in SVGA mode with 600 displayable lines of 800 displayable pixels, increasing the total number of lines for every other frame, whereby SVGA scan conversion is asymmetric.

20. The method of claim 18 wherein the line ratio is selected from the group consisting of:

5:2 during the display period and 6:2 during the vertical blanking period for SVGA to PAL-TV scan conversion, and 12:5 during the display period and 10:5 during the vertical blanking period for VGA to NTSC-TV scan conversion.

* * * * *